Dec. 5, 1967    J. F. TOMPKINS, JR., ET AL    3,356,454
METHODS AND APPARATUS FOR HANDLING NITROGEN TRIFLUORIDE
AND ITS CONVERSION TO TETRAFLUOROHYDRAZINE
Original Filed Oct. 2, 1961    6 Sheets-Sheet 1

INVENTORS
JAMES F. TOMPKINS
BY    EMILE S. J. WANG
Shanley & O'Neil
ATTORNEYS

INVENTORS
JAMES F. TOMPKINS
EMILE S. J. WANG

BY Shanley & O'Neil

ATTORNEYS

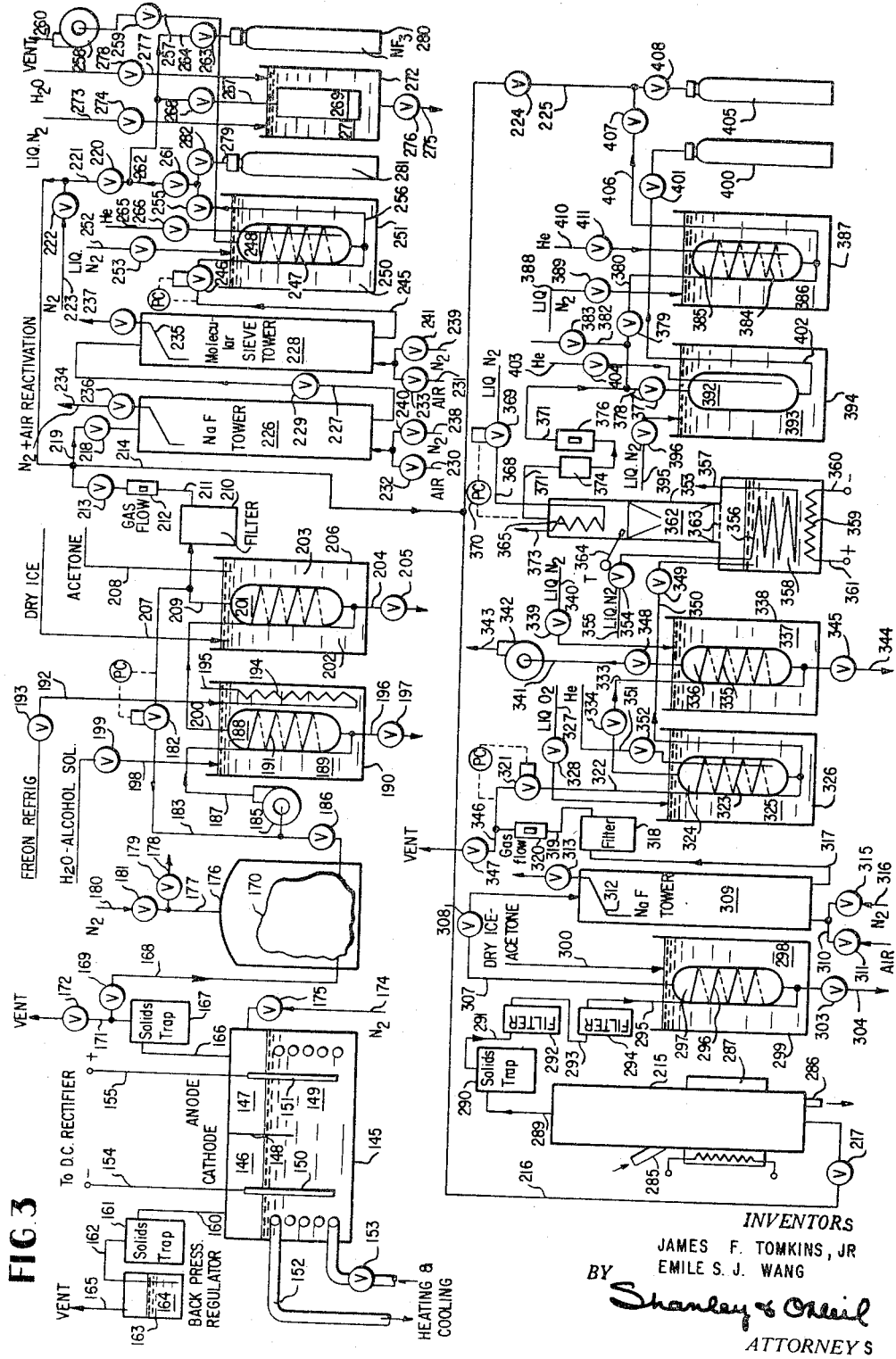

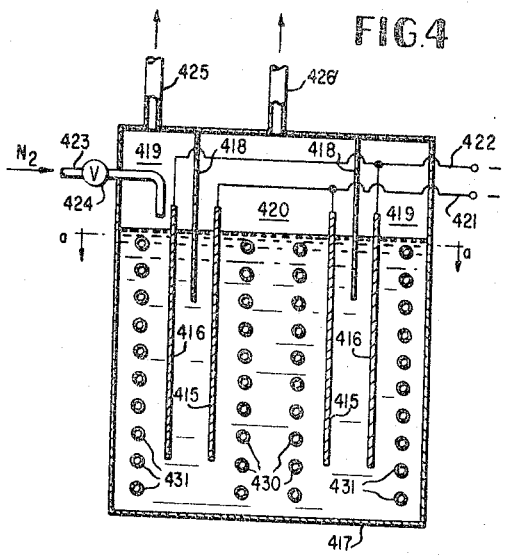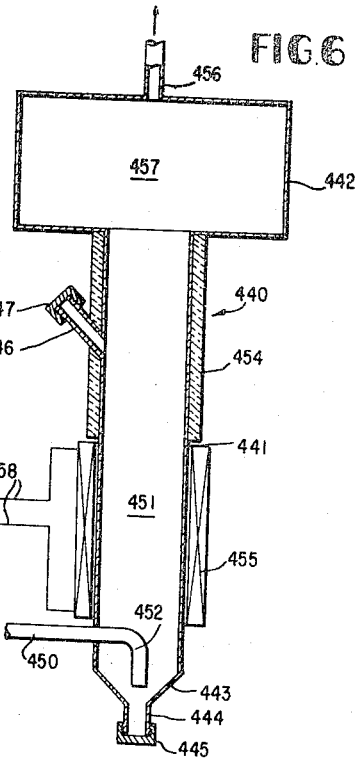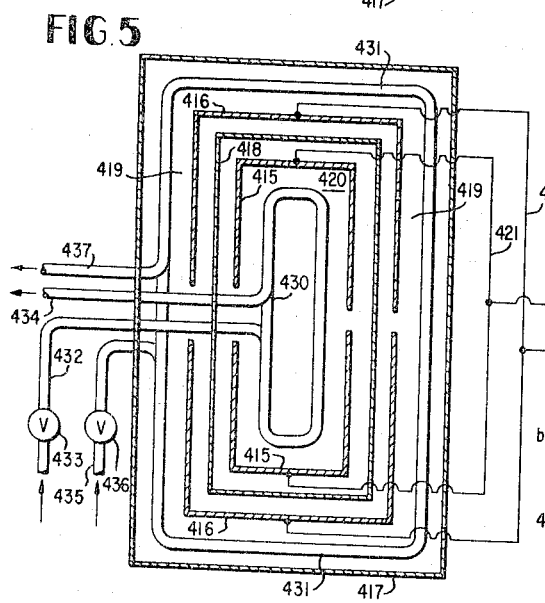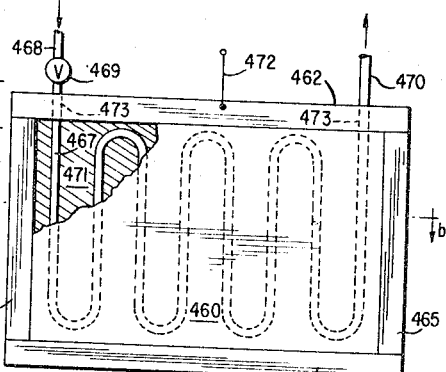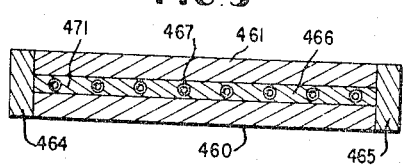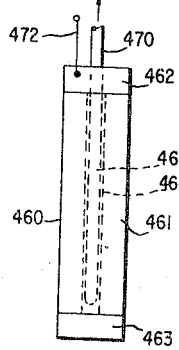

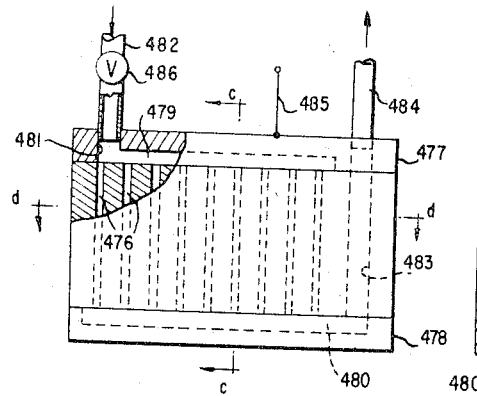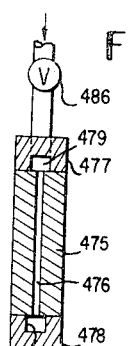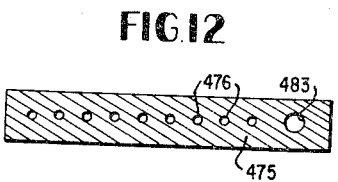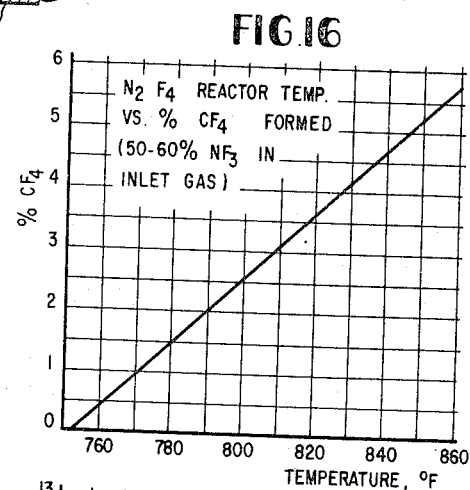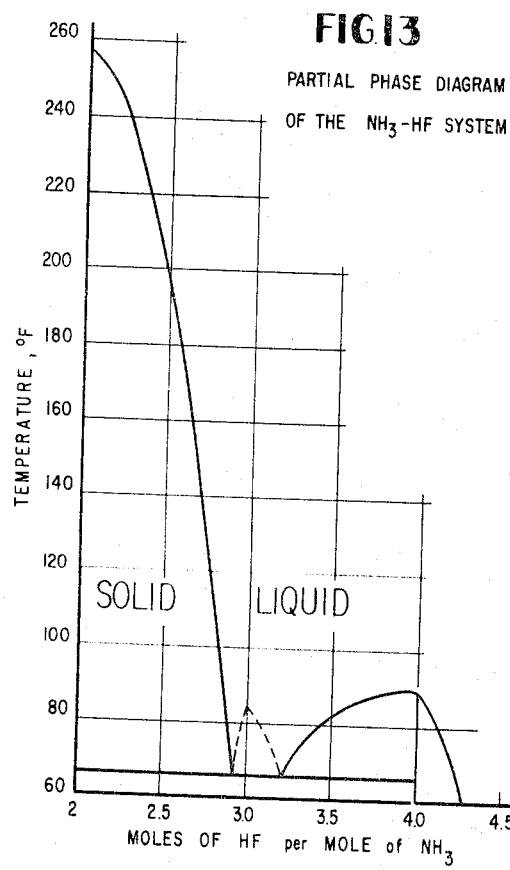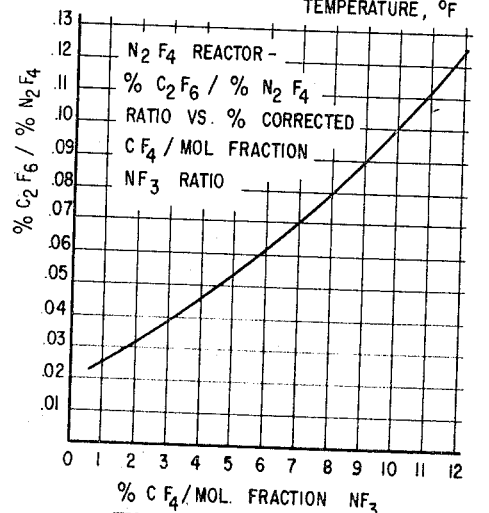

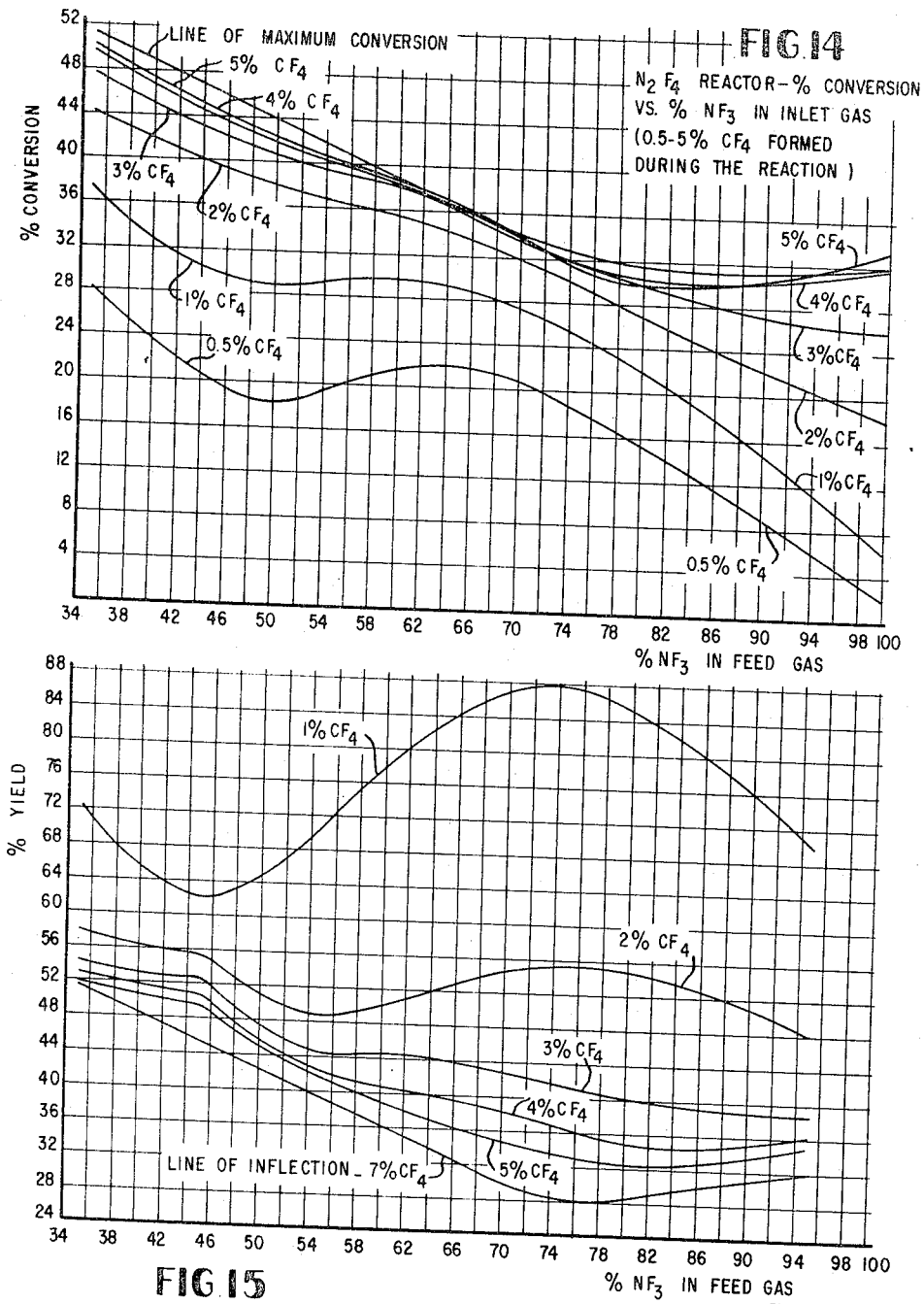

United States Patent Office 3,356,454
Patented Dec. 5, 1967

3,356,454
METHODS AND APPARATUS FOR HANDLING NITROGEN TRIFLUORIDE AND ITS CONVERSION TO TETRAFLUOROHYDRAZINE
James F. Tompkins, Jr., Allentown, Pa., and Emile S. J. Wang, Tullahoma, Tenn., assignors to Air Products and Chemicals, Inc., a corporation of Delaware
Original application Oct. 2, 1961, Ser. No. 142,404, now Patent No. 3,235,474, dated Feb. 15, 1966. Divided and this application Aug. 9, 1965, Ser. No. 510,996
10 Claims. (Cl. 23—190)

This application is a division of application Ser. No. 142,404, filed Oct. 2, 1961, now Patent No. 3,235,474 which in turn is a continuation-in-part of application Ser. No. 73,008, filed Dec. 1, 1960 (now abandoned).

This invention relates to eliminating or substantially reducing the explosion hazard presented by mixtures containing nitrogen trifluoride and, in some of its more specific aspects, to reducing the explosion hazard in systems for producing, handling and reacting mixtures containing nitrogen trifluoride. The invention further relates to electrolytic cells and anodes or cathodes therefor, and to methods and apparatus in general which are especially useful for producing, handling and/or reacting nitrogen trifluoride or tetrafluorohydrazine.

In mixtures containing nitrogen trifluoride, e.g. gaseous or liquid mixtures such as the mixtures in systems for producing and handling nitrogen trifluoride, problems of explosions resulting from reactions between the nitrogen trifluoride and one or more of the components other than nitrogen trifluoride are presented. For example, in the production of nitrogen trifluoride by the electrolysis of a molten salt of hydrogen fluoride and ammonia, hydrogen is evolved along with nitrogen trifluoride and explosions often occur as a result of reaction between the hydrogen and the nitrogen trifluoride. Problems of explosions are also presented in systems for the separation of nitrogen trifluoride from gaseous mixtures containing nitrogen trifluoride and components other than nitrogen trifluoride and in systems for carrying out reactions involving nitrogen trifluoride. Such explosions are dangerous to personnel, costly and result in production losses. Accordingly, the prevention of such explosions is of great importance.

In accordance with the method of the present invention explosion hazards in mixtures, e.g. gaseous or liquid mixtures containing nitrogen trifluoride are eliminated or substantially reduced by maintaining the concentration of the nitrogen trifluoride in the mixture outside the range of 9.4 to 95 mol percent since it has been found that the critical range for the explosive mixtures containing nitrogen trifluoride is from about 9.4 mol percent to 95 mol percent. The preferred method of eliminating or substantially reducing explosion hazards in mixtures containing nitrogen trifluoride comprises diluting the mixture with a diluent material. For this purpose it has been found that the nitrogen trifluoride should be diluted sufficiently to maintain the concentration of the nitrogen trifluoride in the mixture at less than 9.4 mol percent. Suitable diluents are nitrogen, argon, helium and hydrogen. While the mixture of hydrogen with the nitrogen trifluoride is a principal cause of explosions, nevertheless where the concentration of nitrogen trifluoride in the mixture is maintained at less than 9.4 mol percent, explosions are effectively prevented even in the presence of large amounts of hydrogen and thus hydrogen may be used as the diluent.

Where the mixture contains hydrogen and nitrogen trifluoride it has been found that explosion hazards may be eliminated or substantially reduced by maintaining the concentration of the nitrogen trifluoride in the mixture outside the range of 9.4 to 95 mol percent or maintaining the concentration of the hydrogen in the mixture outside the range of 5 to 90.6 mol percent. Accordingly, a preferred method embodying the principles of this invention for eliminating or substantially reducing explosion hazards in mixtures containing nitrogen trifluoride and hydrogen comprises diluting the mixture sufficiently to maintain either the concentration of the nitrogen trifluoride at less than 9.4 mol percent or the concentration of the hydrogen at less than 5 mol percent.

While it is preferred to add other gases as diluents, the explosion hazards may be eliminated or substantially reduced by adding either hydrogen or nitrogen trifluoride in sufficient amount to either bring the concentration of the nitrogen trifluoride in the mixture outside the range of 9.4 to 95 mol percent or to bring the concentration of the hydrogen outside the range of 5 to 90.6 mol percent.

Fuel materials other than hydrogen may be present in nitrogen trifluoride or tetrafluorohydrazine and cause an explosion hazard which may be reduced as noted above. Examples of such fuel materials include hydrocarbons such as oil which may be used for temperature control of an electrolytic cell for producing nitrogen trifluoride, coke or other readily oxidized form of carbon, and oxidizable substances in general such as organic compounds and reactive metals.

Still other problems than an explosion hazard are present when producing, handling and/or reacting nitrogen trifluoride or tetrafluorohydrazine in accordance with prior art practices, and the present invention further provides improved apparatus and methods over those of the prior art. For instance, the present invention provides a novel divided electrolytic cell for the preparation of nitrogen trifluoride which is characterized by improved circulation of the electrolyte and improved heat transfer. This is accomplished without mixing of the gases evolved at the anode and cathode to an appreciable extent, thereby allowing gases evolved at the anode and cathode to be withdrawn separately from the cell and further reducing the explosion hazard since the evolved hydrogen is largely prevented from mixing with the nitrogen trifluoride. A further important advantage of the electrolytic cell of the invention is that the electrolyte may contain a higher HF to $NH_3$ ratio and thereby assure a higher efficiency in nitrogen trifluoride production.

The invention further provides an improved cooled electrode which is especially useful in electrolytic cells for producing nitrogen trifluoride. The cooled electrodes of the invention assure temperature control of the electrode surfaces, and thereby reduce the heating or cooling requirements on temperature control coils which may be immersed in the electrolyte. The cooled electrode surfaces aid in maintaining high hydrogen fluoride to ammonia ratios in the electrolyte and also greatly reduce the rate of corrosion of the electrodes.

The invention further provides an improved method of operating electrolytic cells for producing nitrogen trifluoride wherein the anode life is greatly increased. This may be accomplished by providing anodes and cathodes of similar structure and formed from the same materials of construction and reversing the polarity of the anodes and cathodes periodically during operation of the cell to assure that each of the electrodes is corroded at substantially the same over-all rate.

The invention further provides an improved method of operating a reactor to produce tetrafluorohydrazine from a gaseous feed mixture containing nitrogen trifluoride in the presence of a fluorine acceptor such as carbon. The reactor may be operated to produce a concentration of carbon tetrafluoride in the off gases which has been found to result in optimum yields and conversions for given feed compositions. Additionally, by utilizing carbon as the fluorine acceptor and operating at low reaction temperatures, it has been discovered that a solid composition containing carbon and fluorine is formed and it is possible to greatly reduce the amount of carbon tetrafluoride and fluorocarbon by-products. This greatly simplifies purification of the reaction mixture and improves the yield of tetrafluorohydrazine. The invention also provides an improved, simple, and highly effective method of purifying the off gases from the tetrafluorohydrazine reactor to thereby produce a high purity tetrafluorohydrazine product in excellent yield.

The invention further provides a method of preparing tetrafluorohydrazine in which, for the first time, impure nitrogen trifluoride containing gases may be produced, partially purified to remove objectionable impurities and retain certain non-objectionable impurities or diluents such as nitrogen, the diluted nitrogen trifluoride-containing mixture reacted in the presence of a fluorine acceptor to produce a crude tetrafluorohydrazine reaction product having a low objectionable impurity content, and the crude reaction product purified to produce high purity tetrafluorohydrazine. The above method assures a high yield of tetrafluorohydrazine with a minimum of production difficulties.

With reference more particularly to the drawings:

FIGURE 1 is a plot on triangular coordinates of various concentrations of nitrogen, hydrogen, and nitrogen trifluoride expressed in terms of mol percent;

FIGURE 2 diagrammatically illustrates a layout of an apparatus for electrolytically producing a gaseous mixture containing nitrogen trifluoride and for separating the nitrogen trifluoride from the components of the gaseous mixture other than nitrogen trifluoride wherein the method of this invention is employed for eliminating or substantially reducing the explosion hazard;

FIGURE 3 diagrammatically illustrates an arrangement of suitable apparatus for producing tetrafluorohydrazine;

FIGURE 4 is a sectional view of a divided electrolytic cell suitable for producing nitrogen trifluoride which may be used in the apparatus of FIGURE 3;

FIGURE 5 is a sectional view taken along the line $a$—$a$ of the divided electrolytic cell of FIGURE 4;

FIGURE 6 is a sectional view of a reactor which may be used in the apparatus of FIGURE 3 for reacting nitrogen trifluoride with a fluorine acceptor such as carbon to produce tetrafluorohydrazine;

FIGURE 7 is a view in elevation of a cooled electrode which may be used in the electrolytic cell of FIGURE 3 for producing nitrogen trifluoride;

FIGURE 8 is an end view of the electrode of FIGURE 7;

FIGURE 9 is a sectional view taken along the line $b$—$b$ of FIGURE 7;

FIGURE 10 is a view in elevation of a different type of cooled electrode which may be used in the electrolytic cell of FIGURE 3 for producing nitrogen trifluoride;

FIGURE 11 is a sectional view taken along the line $c$—$c$ of FIGURE 10;

FIGURE 12 is a sectional view taken along the line $d$—$d$ of FIGURE 10;

FIGURE 13 is a graph which is a partial phase diagram of the $NH_3$-HF system;

FIGURE 14 is a graph illustrating percent conversion to tetrafluorohydrazine vs. percent nitrogen trifluoride in the feed to the tetrafluorohydrazine reactor when the off gases contain 0.5–5.0% $CF_4$ which was formed during the reaction;

FIGURE 15 is a graph illustrating the manner in which the percent yield of tetrafluorohydrazine varies with the percent of nitrogen trifluoride in the feed gas to the tetrafluorohydrazine reactor when the off gases from the reactor contain 1–5% $CF_4$ which was formed during the reaction;

FIGURE 16 is a graph illustrating the manner in which the percent $CF_4$ formed in the tetrafluorohydrazine reactor varies with the reaction temperature when the feed to the reactor contains 50–60% nitrogen trifluoride; and FIGURE 17 is a graph illustrating the manner in which the percent $C_2F_6$/percent $N_2F_4$ ratio varies with the percent $CF_4$ in the reactor products/mol fraction of $NF_3$ in the feed gas to the tetrafluorohydrazine reactor.

Figure 1:
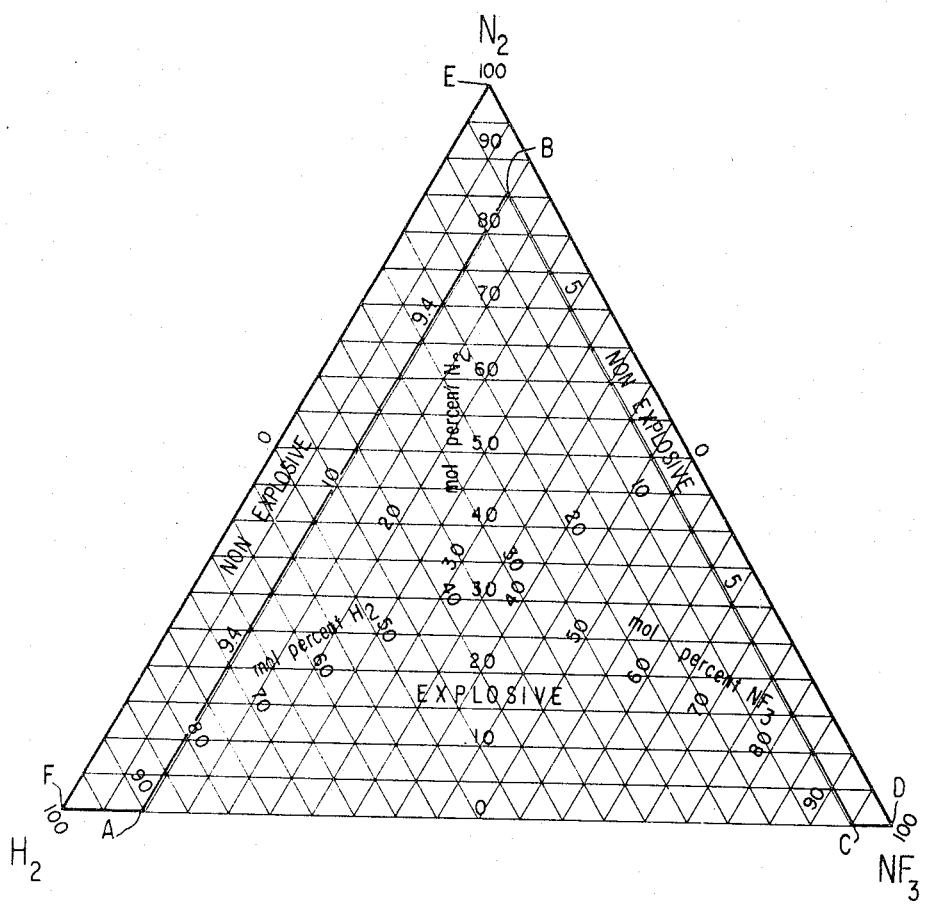

The critical relative proportions of hydrogen, nitrogen and nitrogen trifluoride may be best defined by reference to FIGURE 1. As indicated in FIGURE 1, the explosive mixtures of hydrogen, nitrogen, and nitrogen trifluoride fall below the lines AB and BC on FIGURE 1 of the drawings and compositions falling in the area above lines AB and BC are non-explosive. Accordingly, the explosion hazard in mixtures containing nitrogen trifluoride and hydrogen, with or without nitrogen, may be eliminated or substantially reduced by diluting the mixture with a sufficient amount of at least one of the materials selected from the group consisting of nitrogen trifluoride, hydrogen and nitrogen, preferably nitrogen, to maintain the relative concentrations of the materials in the mixture within the area defined approximately in FIGURE 1 of the accompanying drawings by the solid lines AB, BC, CD, DE, EF and FA. Since nitrogen trifluoride, hydrogen and nitrogen are gases at room temperature and atmospheric pressure generally the above referred to mixtures are gaseous mixtures. However, it is to be understood that the method of this invention is equally applicable to liquid mixtures containing nitrogen trifluoride.

Figure 2:
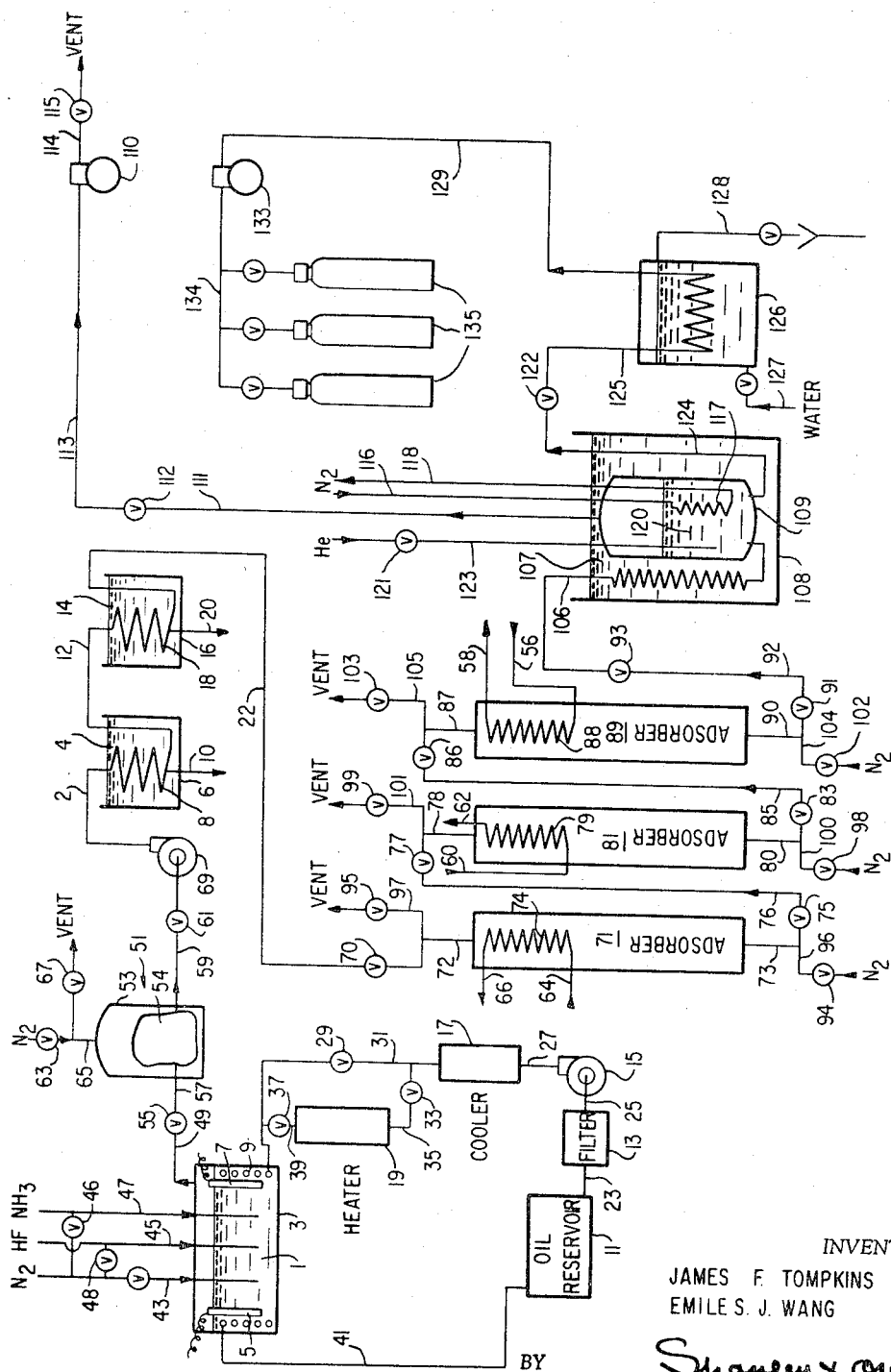

An example of the application of this invention to a system for producing and handling nitrogen trifluoride is illustrated in FIGURE 2 of the drawings wherein a molten salt 1 of hydrogen fluoride and ammonia is provided in an electrolytic cell 3. The molten salt is subjected to electrolysis by the application of a current through electrodes 5 and 7. While in a conventional commercial cell of this type a plurality of anodes and cathodes may be employed, for purposes of clarity a single anode 5 and cathode 7 are shown in the schematic representation of cell 3 in the drawings.

The electrolysis of the molten salt 1 results in the evolution of hydrogen at the cathode 7 and a gaseous mixture at the anode 5 containing nitrogen trifluoride and components other than nitrogen trifluoride more particularly hydrogen fluoride, nitrous oxide, difluorodiazine, nitrogen and small amounts of various other impurities. In a conventional cell, a plurality of anodes and cathodes are employed whereby the hydrogen mixes with the gaseous mixture containing nitrogen trifluoride thereby forming part of the gaseous mixture. In such cells generally the amount of hydrogen in the gaseous mixture substantially exceeds the amount of nitrogen trifluoride. Accordingly, sufficient diluent gas preferably nitrogen is added through conduit 43 to maintain the over-all concentration of the nitrogen trifluoride in the gaseous mixture at less than 3 mol percent. For best results it has been found that the diluent gas should be introduced below the surface of the molten salt 1.

While a concentration of less than 9.4 mol percent of nitrogen trifluoride is sufficient to prevent explosions, the nitrogen trifluoride tends to evolve in a manner to produce high localized concentrations and poor mixing with the diluent nitrogen gas. Thus, in order to maintain the nitrogen trifluoride concentration below 9.4 mol percent in these localized areas, it is necessary to add sufficient nitrogen to maintain the over-all nitrogen trifluoride concentration at less than 3 mol percent.

In some electrolytic cells for the production of nitrogen trifluoride the cathodes are separated from the anodes by suitable means such as a diaphragm to prevent mixing of the hydrogen with the gaseous mixture containing nitrogen trifluoride. However, even with such cells an amount of hydrogen sufficient to produce an explosive mixture often leaks into the anode compartment and becomes mixed with the gaseous mixture containing nitrogen trifluoride thereby forming part of the gaseous mixture. With cells of this type a sufficient amount of diluent gas preferably nitrogen is added in the anode compartment to maintain the concentration of the hydrogen in the gaseous mixture at less than 5 mol percent.

As electrolysis proceeds and the molten salt electrolyte becomes depleted, the salt is replenished by passing gaseous ammonia into the molten salt through conduit 47 and by passing gaseous hydrogen fluoride into the molten salt through conduit 45. The gaseous ammonia and gaseous hydrogen fluoride react beneath the surface of the molten salt 1 to produce additional salt.

For one type of cell with relatively poor heat transfer and having a plurality of spaced plates which tend to over heat during prolonged cell operation, it has been found that the ratio of hydrogen fluoride to ammonia in the electrolyte preferably should be maintained at at least 2.05:1 and for best results in a range from 2.05 to 2.10:1. Where a ratio of hydrogen fluoride to ammonia of 2:1 is employed, practically no nitrogen trifluoride is generated. In addition the hydrogen fluoride and ammonia react to form ammonium fluoride and ammonium bifluoride and where the ratio is below 2:1, not only is little or no nitrogen trifluoride produced but the electrolyte resulting from the reaction of the hydrogen fluoride and ammonia tends to have an unduly high concentration of ammonium fluoride as compared to the ammonium bifluoride. Ammonium fluoride sublimes at temperatures above 200° F. forming an ammonium fluoride mist which plugs the conduits. Ammonium bifluoride on the other hand, has a boiling point above 300° F., and a melting point of 255° F. Thus at a temperature sufficient to melt ammonium bifluoride the ammonium fluoride forms the undesirable mist. Accordingly a sufficient excess of hydrogen fluoride is required in order to prevent the formation of excessive amounts of ammonium fluoride in the electrolyte.

At ratios of hydrogen fluoride to ammonia greater than 2.10:1 the hydrogen fluoride concentration in the cell gas from this specific cell with relatively poor heat transfer becomes excessive, being greater than 5 percent. Where the hydrogen fluoride in the cell gas is greater than 5 percent, the hydrogen fluoride removal system becomes less efficient and where the hydrogen fluoride concentration reaches 10 percent the adsorbers to be described below may become plugged even when regenerated regularly. This makes the cost of processing excessive.

In order to prevent back-up of electrolyte in conduits 45 and 47, at least a portion and possibly all of the diluent nitrogen gas is added to the ammonia through valve 46 and to the hydrogen fluoride through valve 48.

During initial operation of the cell 3 the heat generated by the electrolytic process is inadequate to maintain the cell 3 at a temperature above the melting point of the salt electrolyte, i.e., 255° F. and accordingly the bath must be heated. However, when normal operation is reached, the heat generated by the electrolytic process is in excess of that required to maintain the bath at the desired operating temperature and the excess heat must be removed. Temperature control is very important since an increase in temperature decreases the amount of hydrogen fluoride in the electrolyte down to and below a ratio of hydrogen fluoride to ammonia of 2:1 by volume. Increasing the temperature results in an increase in the amount of hydrogen fluoride in the evolved gases and decreased nitrogen trifluoride. The amount of hydrogen fluoride evolving from the electrolyte is a function of both the temperature and concentration. Since higher hydrogen fluoride concentration decreases the resistance of the cell, more nitrogen trifluoride is produced per unit of power. As concentration rises, more hydrogen fluoride is evolved out of the cell. Accordingly, selection of the best temperature may be obtained by striking an economic balance between the decreased power costs and the hydrogen fluoride passed out of the cell. It is preferred to maintain the temperature from 255° F. to 265° F.

Control of the temperature is accomplished by heat exchange between the molten salt 1 and a suitable circulating fluid such as oil. Such heat exchange may be accomplished by the use of any conventional means such as a coil of tubing or pipe 9 provided inside the cell 3. In one apparatus for carrying out the electrolysis, cell 3 may comprise two concentric walls with a coil of pipe or tubing on the inside of the inner wall, a second coil between the two walls and a third coil outside the outer wall.

The oil circulation system for controlling the temperature in the fused bath 1 is of a conventional type and may comprise an oil reservoir 11, a filter 13, a pump 15, a cooler 17 and a heater 19. In the operation of the oil circulation system, the oil is withdrawn from reservoir 11, through conduit 23, filter 13, and conduit 25 by means of pump 15 which forces the oil through conduit 27 to cooler 17. The cooler 17 may be any suitable cooling device such as a heat exchanger whereby the oil is cooled by heat exchange with a cooling fluid such as water. During the initial portion of the operation, the cooling medium is turned off so that the oil passes through cooler 17 without appreciable change in temperature. During this portion of the operation valve 29 in bypass conduit 31 is closed while valve 33 in conduit 35 and valve 37 in conduit 39 are open whereby oil from cooler 17 flows through valve 33, conduit 35, heater 19, conduit 39 and valve 37 to coil 9. The heater 19 may be any conventional type such as an electric heater. The heated oil then passes through coil 9 heating the molten salt 1 to the desired temperature. The oil returns to the reservoir 11 from coil 9 through conduit 41.

When the electrolysis has proceeded to the point where the heat of reaction is in excess of that required to maintain the molten salt at the desired temperature valves 33 and 37 are closed and valve 29 is opened. Also, operation of cooler 17 is begun whereby the oil is cooled in cooler 17 and passes directly to coil 9 through conduit 31 and valve 29 to maintain the molten salt 1 at the desired temperature.

In order to provide for holdups in processing of the gaseous mixture evolved in cell 3 due to intermittent operation of the nitrogen trifluoride condensing equipment, to be described below, and possible equipment failures, a gas collection device 51 is provided. This device comprises a gas-tight container 53 with a gas bag 54 of a material such as polyethylene provided within the container. The gaseous mixture from cell 3 passes through conduit 49, check valve 55 and conduit 57 into gas bag 54. The gaseous mixture flows out of gas bag 54 through conduit 59 which passes through the wall of container 53.

While collecting the gaseous mixture from the electrolytic cell 3, valve 61 in conduit 59 is closed whereby the gaseous mixture flows into bag 54 through check valve 55 and any gas present in container 53 outside gas bag 54 may be vented through valve 67. Valves 63 and 67 are regulator valves to control the flow of nitrogen into and out of container 53. Valve 63 is set at the desired operating pressure of cell 3 and valve 67 is set slightly above it. Thus, gas bag 54 acts as an accumulator volume which accumulates gas from conduit 49 while valve 61 is closed, and during this time nitrogen is passed to vent through valve 67. When valve 61 is opened and the accumulated gas is drawn off by blower 69, nitrogen through valve 63 fills the space between gas bag 54 and container 53. The nitrogen purges the volume in container 53 outside of the gas bag 54 to prevent atmospheric gases from diffusing into the cell product.

The gas flowing from bag 54 through conduit 59 and valve 61 is forced through the purification equipment by a blower 69. From blower 69, the diluted gaseous mixture is passed through conduit 2, into heat exchange relationship with an ice bath 4 in a container 6 by passage through coil 8 which is immersed in the ice bath 4 thereby cooling the gaseous mixture. During passage through coil 8 a portion of the hydrogen fluoride is condensed along with water vapor to form a liquid. This liquid is removed from the system through conduit 10. The diluted gaseous mixture is then passed through conduit 12 in heat exchange relationship with a Dry Ice bath 14 contained in a container 16 by passage through coil 18 thereby cooling the gaseous mixture further and condensing an additional portion of the hydrogen fluoride and water vapor to form a liquid. This liquid is removed from the system through conduit 20. A suitable Dry Ice bath is one which comprises a mixture of Dry Ice and acetone.

The diluted gaseous mixture which contains a substantially reduced amount of hydrogen fluoride is now passed through conduit 22, valve 70 and conduit 72 into intimate contact with an adsorbent material in an adsorber 71 which retains hydrogen fluoride thereby removing a substantial portion of the hydrogen fluoride from the impure nitrogen trifluoride gas. The preferred adsorbent material is sodium fluoride. It is preferred to carry out the adsorption in adsorber 71 at a temperature of about 200° F. Accordingly, adsorber 71 is heated by suitable means such as coil 74 having heating fluid such as steam circulating therethrough. The steam enters coil 74 through a conduit 64 and leaves through a conduit 66.

The gas from adsorber 71 passes through conduit 73, valve 75, conduit 76, valve 77, and conduit 78 into intimate contact with an adsorbent material such as sodium fluoride contained in an adsorber 81 wherein the balance of the hydrogen fluoride is removed. The gas in adsorber 81 is cooled down to room temperature by suitable cooling means such as coil 79 having a cooling fluid such as water circulating therethrough. The cooling fluid enters the coil 79 through conduit 60 and leaves through conduit 62.

The substantially hydrogen fluoride free impure nitrogen trifluoride gas passes from adsorber 81 through conduit 80, valve 83, conduit 85, valve 86, and conduit 87 into intimate contact with an adsorbent material which retains nitrous oxide contained in an adsorber 89. A preferred adsorbent is a synthetic material in crystalline form having the following composition expressed in terms of oxides:

$$0.9 \pm 0.2 M_{2/n}O : Al_2O_3 : 2.5 \pm 0.5 SiO_2 : Y H_2O$$

In the above the symbol M represents at least one cation having a valence represented by a symbol $n$ of not more than three, the symbol Y representing any value up to about 8. The atoms of this material are arranged in a unit cell in a manner wherein the X-ray powder diffraction pattern of the material is essentially the same as that shown in the table below wherein $d$ is the interplanar spacing in angstroms (A.).

Table $d$ Value in A.

14.42±0.2
8.82±0.1
4.41±0.05
3.80±0.05
3.33±0.05
2.88±0.05
2.79±0.05
2.66±0.05

The temperature of the gas flowing through adsorber 89 is reduced to about the freezing point of water by suitable cooling means such as a coil 88 having a suitable cooling fluid such as ice water circulating therethrough. The ice water enters through conduit 56 and leaves through conduit 58. In adsorber 89, substantially all of the nitrous oxide and some of the difluorodiazine is removed. The nitrous oxide, hydrogen fluoride free gaseous mixture passes from adsorber 89 through conduit 90, valve 91 and conduit 92 to expansion valve 93.

Since the impurities build up on the adsorbent material in adsorbers 71, 81 and 89, it is necessary to periodically remove these impurities in order to reactivate the adsorbent material. Reactivation may be carried out by purging the adsorbers with a suitable gas such as nitrogen. This is accomplished by closing the valves 70 and 75 to adsorber 71 and opening valves 94 and 95 whereby nitrogen may enter adsorber 71 through conduits 96 and 73 and exit through conduits 72 and 97. The nitrogen for purging purposes is heated to a temperature sufficient to remove the impurities from the adsorbent material.

When purging is complete, valves 94 and 95 are closed and valves 70 and 75 are opened to permit further adsorption of hydrogen fluoride from the gaseous mixture containing nitrogen trifluoride. Purging of adsorbers 81 and 89 is carried out in a similar manner by closing valves 77 and 83 and opening valves 98 and 99 to adsorber 81 permitting nitrogen to flow through conduits 100 and 101 and closing valves 86 and 91 and opening valves 102 and 103 to adsorber 89 permitting nitrogen to flow through conduits 104 and 105. During the purging operation cell gases may be collected in gas bag 54 in the manner described above. Alternatively pairs of adsorbers 71, 81 and 89 may be employed whereby one adsorber is purged while the other is on stream with the adsorbers being switched periodically in a manner well known in the art.

The remaining gaseous mixture from conduit 92 is expanded across expansion valve 93 and cooled by passing through conduit 106 in heat exchange relationship with liquid nitrogen 107 in container 108 thereby liquefying the nitrogen trifluoride and separating it from a major portion of the remaining components other than nitrogen trifluoride. The liquid nitrogen trifluoride 120 is collected in a container 109 immersed in the liquid nitrogen 107. The conduit 106 may be wound around the container 109 to provide a large heat exchange surface area in contact with the liquid nitrogen 107. A vacuum is maintained in container 109 by means of a vacuum pump 110 connected to container 109 through conduit 111, valve 112 and conduit 113. The components of the gaseous mixture other than nitrogen trifluoride including the nitrogen diluent gas and the hydrogen are removed through conduit 111. Valves 121 and 122 are closed during these operations. The nitrogen diluent is not needed after this step since the hydrogen is removed whereby the concentration of hydrogen is substantially less than 5 mol percent. The gases from vacuum pump 110 leave the system through conduit 114 and valve 115. In order to separate the nitrogen trifluoride from substantially all the remaining components of the gaseous mixture other than nitrogen trifluoride valve 91 is closed when container 109 is filled, the pressure in container 109 is substantially reduced by means of vacuum pump 110 and the liquid 120 collected in container 109 is heated through heat exchange with nitrogen gas passing through coil 117 immersed in liquid 120. The nitrogen gas is supplied to coil 117 through conduit 116 and exits through conduit 118. When the separation of the nitrogen trifluoride from the components other than nitrogen trifluoride is complete, valve 112 is closed and valves 121 and 122 are opened. Pressure is then applied to the surface of the liquid nitrogen trifluoride by helium entering through conduit 123 thereby forcing the nitrogen trifluoride out of container 109 through conduit 124, valve 122 and conduit 125 into a vaporizer 126. Helium is particularly suitable for this purpose since it is inert, noncondensible at the temperature of the liquid nitrogen 107 and is substantially insoluble in the liquid nitrogen trifluoride.

Continuous operation of the purification equipment may be obtained by providing a plurality of containers 109 and associated conduits and equipment whereby liquid nitrogen trifluoride may be collected in one container while the nitrogen trifluoride is being forced out of another container. Continuous operation may also be obtained by collecting the liquefied nitrogen trifluoride in a collection container and passing it to a container similar to container 109 through a valved conduit by suitable means such as by gravity flow. With this arrangement the valve in the conduit between the two containers may be closed and collection of the liquid nitrogen trifluoride in the collection container continued during the period that liquid nitrogen trifluoride is being heated and blown out of the container which is similar to container 109.

The liquefied nitrogen trifluoride is vaporized in vaporizer 126 by heat exchange with a suitable fluid such as water which enters through conduit 127 and exits through conduit 128. The vaporized nitrogen trifluoride is passed through conduit 129 to a compressor 133 where it is compressed and passed into a header 134 from which it is delivered to suitable containers such as cylinders 135.

The following data are typical of conditions existing in one type of nitrogen trifluoride electrolytic cell and system for separating nitrogen trifluoride from the gaseous mixture evolved from the cell when the method of the present invention is employed for eliminating or substantially reducing the explosion hazard. On the basis of an electrolytic cell 3 having relatively poor heat transfer and which evolved 40 standard cubic feet per hour of an undiluted gaseous mixture containing nitrogen trifluoride, 110 standard cubic feet per hour of nitrogen is added to the cell gases as a diluent. Such a cell operates at 2,000 amperes of current. The molten salt electrolyte 1 is replenished periodically as needed by the addition of hydrogen fluoride to ammonia in the electrolyte at a mol ratio of 2:07:1. In order to prevent back flow, nitrogen is added to the hydrogen fluoride at a rate of 2 standard cubic feet of nitrogen for every 150 standard cubic feet of hydrogen fluoride and nitrogen is added to the ammonia at a rate of two standard cubic feet of nitrogen for every 75 standard cubic feet of ammonia.

The electrolyte in the cell is maintained at a temperature of 260° F. by the oil circulation system. The oil is circulated at a rate of 50 gallons per minute and is cooled in cooler 17 to a temperature of 250° F. Electrolytic cell 3 is closed and the pressure in the cell as a result of the added diluent gas and the evolved gaseous mixture is about 2 inches of water.

The diluted gaseous mixture leaves the cell through conduit 49 at a rate of 150 standard cubic feet per hour and comprises 1–3% nitrogen trifluoride, 2–6% hydrogen fluoride, 0.05% difluorodiazine, 0–0.3% nitrous oxide, 20% hydrogen, the balance being small amounts of other impurities and nitrogen, 3–5% of the nitrogen being generated by the electrolytic reaction and the balance being the nitrogen which was added to dilute the gas. Normally the gaseous mixture flows straight through gas bag 54 and out conduit 59. Valve 61 is closed and the gaseous mixture flows into gas bag 54 normally only for a period of 3 minutes of every three hours, i.e. during the time valve 91 is closed to permit pressure reduction in container 109, heating of liquid 120 and forcing liquid 120 out of container 109. However, gas bag 54 has a capacity of 75 cubic feet and thus in the event of an emergency shut down of the purification equipment, cell operation may continue for ½ hour. The pressure of the gaseous mixture forced from gas bag 54 is the same as the cell pressure, i.e. about 2 inches of water. This pressure is increased to about 5 p.s.i.g. by means of blower 69 which pressure is sufficient to force the gas through coils 8 and 18 and the adsorbers 71, 81 and 89 to pressure reducing valve 93. The ice bath 4 has a temperature of 32° F. and the Dry Ice bath 14 comprises a mixture of Dry Ice and acetone and is at a temperature of −100° F. The liquid leaving coil 8 through conduit 10 contains 50% HF, and the liquid leaving coil 18 through conduit 20 contains 80% HF. The gaseous mixture leaving coil 18 through conduit 22 contains 1% HF.

The cooled gaseous mixture enters the adsorber 71 at a temperature of about 200° F. and it is maintained at that temperature in the adsorber by steam flowing through coil 74. The adsorbent material in adsorber 71 is sodium fluoride.

The gaseous mixture leaves adsorber 71 with $\frac{1}{10}$ of 1% hydrogen fluoride and is cooled to room temperature, i.e. about 70° F. in adsorber 81 by room temperature cooling water flowing through coil 79. Adsorber 81 contains sodium fluoride as the adsorbent material. The gas leaving adsorber 81 is substantially free of hydrogen fluoride. In passing through adsorber 89 the gaseous mixture is cooled to 35° F. by ice water flowing through coil 88. The adsorbent material in adsorber 89 is the material described above as preferred for adsorber 89. After passing through adsorber 89 the gaseous mixture is substantially free of nitrous oxide. Pairs of adsorbers 71, 81, and 89 are employed to permit purging of one adsorber of the pair while the other is on stream as described above. Since such pairs are well known to those skilled in the art only one adsorber 71, 81 and 89 of each pair is shown in FIG. 2 for the sake of clarity.

The temperature of the liquefied nitrogen trifluoride in container 109 is −315° F. When container 109 is filled the pressure is reduced to 1 mm. of mercury and the liquid nitrogen trifluoride 120 in container 109 is heated to a temperature of −300° F. to remove substantially all the remaining components other than nitrogen trifluoride leaving a liquid containing 98% nitrogen trifluoride. The 98% nitrogen trifluoride is forced out of container 109 through conduit 124 at a rate of 3 s.c.f.m. by the 10 p.s.i.g. pressure of the helium entering container 109 through conduit 123. The reduction of the pressure to 1 mm. of mercury, heating to −300° F. and removal of nitrogen trifluoride from container 109 requires about 3 minutes once every three hours. The nitrogen trifluoride is vaporized in vaporizer 126 and leaves the vaporizer at a temperature of 70° F. This gas is compressed in compressor 133 to a pressure of 15 p.s.i.g. and fed into header 134 from which it is passed into cylinder 135.

An example of the application of this invention to a system for carrying out reactions involving nitrogen trifluoride is a system for the production of tetrafluorohydrazine. Tetrafluorohydrazine may be produced by the thermal reaction at a suitable temperature such as about 600–1000° F. of nitrogen trifluoride with various metals (M) such as stainless steel, copper, arsenic, antimony, bismuth, cobalt, mercury, boron and uranium according to the equation $2NF_3+M \rightarrow N_2F_4+MF$. In a flow reactor packed with copper turnings at 707° F. with a residence time of 13 minutes, tetrafluorohydrazine may be produced from nitrogen trifluoride at a 42 to 62% conversion and a yield of 62 to 71%. The tetrafluorohydrazine is purified by distillation of the residual nitrogen trifluoride from an n-pentane slush bath (−205° F.) which retains the tetrafluorohydrazine. Further purification is carried out by a gas phase adsorption using a material such as that described above as preferred for adsorber 89.

The explosion hazard may be eliminated or substantially reduced by the addition of a diluent gas such as argon in a sufficient amount to maintain the concentration of nitrogen trifluoride in the nitrogen trifluoride containing mixture at less than 9.4 mol percent. It is preferred to add the diluent to the nitrogen trifluoride prior to passing the nitrogen trifluoride into the reactor.

The surface of many metals tends to become inactive and this may be avoided by selecting a metal producing a volatile fluoride such as boron and uranium, or by using mercury with agitation sufficient to assure a fresh surface being presented periodically to the nitrogen trifluoride for further reaction. Non-metals such as sulfur producing volatile fluorides also may be used. Carbon is especially useful and may be preferred for commercial installations.

FIGURE 3 of the drawings diagrammatically illustrates an arrangement of apparatus for practicing an integrated process for the preparation of nitrogen trifluoride and its subsequent conversion to tetrafluorohydrazine in accordance with the invention. Upon reference to FIGURE 3, the electrolytic cell 145 is divided into a cathode compartment 146 and an anode compartment 147 by means of a skirt or diaphragm 148 which extends downward from the top of the cell into the molten electrolyte 149 between cathode 150 and anode 151. A coil 152 may be provided for heating or cooling the electrolyte, as necessary, in order to assure a desired electrolyte temperature. A suitable cooling or heating fluid such as an oil derived from petroleum may be supplied to coil 152 at a rate controlled by valve 153, and the oil may be at a desired temperature designed to heat or cool the electrolyte and thereby maintain it at a predetermined temperature. An arrangement of apparatus for assuring a desired temperature for the oil is illustrated in FIGURE 2. The cathode and anode may be provided with electrical leads 154 and 155, respectively, which are connected to a source of direct current such as a rectifier.

The electrolyte 149 may be a molten ammonium bifluoride containing hydrogen fluoride and ammonia in a mol ratio of HF to $NH_3$ between 2.05:1 and 2.8:1 and its temperature may be maintained above the melting point and sufficiently low to prevent excessive volatilization of hydrogen fluoride. The electrolysis of the electrolyte 149 results in evolution of gas discharging from the cathode compartment 146 via line 160 which is largely hydrogen with small amounts of nitrogen trifluoride, hydrogen fluoride, nitrous oxide and nitrogen. The cathode gas is passed through solids trap 161 to remove entrained solids, and then via conduit 162 into back pressure regulator 163 which is partially filled with liquid 164. The conduit 162 extends below the surface level of liquid 164 sufficiently to maintain a desired back pressure and thus the cathode gas is bubbled therethrough before being vented via conduit 165. The liquid 164 may be Fluorolube oil, which is said to be a liquid addition polymer of trifluorovinyl chloride having the recurring unit $-CF_2CFCl-$. The vented gases may be passed into contact with a caustic solution before being passed to the atmosphere.

The gas evolved in the anode compartment 147 is withdrawn via conduit 166 and passed to solids trap 167 where entrained solids are removed, and then passed through conduit 168 including valve 169 into gas bag 170. A conduit 171 including valve 172 is provided leading from conduit 168 whereby product gas may be withdrawn for testing or other purposes upon closing valve 169 and opening normally closed valve 172. The cathode compartment 147 may be supplied with a diluent gas such as nitrogen via conduit 174 at a rate controlled by valve 175 and in an amount to insure that the nitrogen trifluoride content is at a non-explosive level as discussed in connection with FIGURE 2 and/or to provide a desired nitrogen content in the feed to the tetrafluorohydrazine reactor to be described hereinafter. The gas withdrawn from the anode compartment may contain on an undiluted basis 65–70% nitrogen trifluoride, 1–3% dinitrogen difluoride, 0–2% nitrous oxide, 0–1% hydrogen, 2–10% hydrogen fluoride and the balance nitrogen. Varying amounts of water vapor also may be present.

The gas bag 170 is contained within airtight vessel 176, and the pressure within vessel 176 is controlled by supplying or withdrawing gas via conduit 177. When collecting anode gas, valve 186 is closed and as the gas bag 170 expands gases in vessel 176 may be withdrawn to prevent undue pressure build-up via conduit 177 and vented through conduit 178 at a rate controlled by valve 179. When discharging anode gas, valve 186 is open and gaseous nitrogen or other suitable gas under pressure may be supplied via conduit 180 at a rate controlled by valve 181 to thereby increase the pressure within vessel 176 and compress gas bag 170. When continuous operation of the tetrafluorohydrazine reactor is desired, valve 186 is maintained in the open position and the anode gas is withdrawn continuously without collecting in appreciable volume in gas bag 170.

A blower 185 may be provided to move the gas discharged from the anode compartment through the system without causing undue pressure in cell 145. Valve 182 in conduit 183 is normally closed and the anode gas may be withdrawn from gas bag 170 upon opening valve 186 and passed by means of blower 185 through conduit 187 into vessel 188. The vessel 188 may be immersed in a liquid coolant such as water-alcohol solution 189 contained in vessel 190, and the portion 191 of conduit 187 may be coiled around vessel 188 before entering at the bottom. The solution 189 may be supplied via conduit 198 upon opening valve 199, and it is maintained at a desired temperature for condensation of a liquid hydrogen fluoride-water mixture from the gaseous mixture flowing in conduit 187, such as at about $+20°$ F. This may be conveniently accomplished by supplying Freon refrigerant via conduit 192 at a rate controlled by valve 193 to coil 194 where it is expanded and withdrawn via conduit 195. The liquid collecting in vessel 188 may contain about 50% by weight hydrogen fluoride in water, and it may be withdrawn periodically via conduit 196 upon opening valve 197.

Uncondensed gases are withdrawn from the top of vessel 188 via conduit 200 and passed into vessel 201 immersed in a liquid coolant 202 such as a Dry Ice-acetone bath maintained at about $-100°$ F. A portion 203 of conduit 200 may be wrapped around vessel 201 in the form of a coil. Additional hydrogen fluoride and water are condensed from the gases flowing within conduit 200 and the liquid collects in vessel 201. The collected liquid may contain by weight about 80% hydrogen fluoride and the remainder water, and may be withdrawn from vessel 201 periodically via conduit 204 upon opening valve 205. When a Dry Ice and acetone bath is used, the liquid coolant 202 contained in vessel 206 may be supplied as indicated by lines 207 and 208, respectively. The gaseous mixture withdrawn from vessel 201 via conduit 209 may contain about ½–1% hydrogen fluoride and it is normally passed to filter 210 where any entrained solid matter is removed, then withdrawn from filter 210 via conduit 211, and passed through flowmeter 212 at a rate controlled by valve 213. However, it may be recycled back to blower 185 or gas bag 170 via conduit 183 upon opening valve 182 and closing valve 213.

The partially purified anode gas containing nitrogen fluoride and large amounts of gaseous diluent and smaller amounts of other impurities may be passed continuously as it is produced by cell 145 to tetrafluorohydrazine reactor 215 via conduits 214 and 216 upon opening valve 217 and closing valve 218 in conduit 219, valve 220 in conduit 221, valve 222 in conduit 223, and valve 224 in conduit 225. However, the anode gas may be further purified and stored awaiting feeding to reactor 215 in instances where continuous operation of reactor 215 is not desired or reactor 215 is off-stream. Usually it is preferred that the diluted, partially purified anode gas be passed directly to reactor 215 and used in the continuous preparation of tetrafluorohydrazine as described hereinafter.

In instances where the gaseous mixture flowing in conduit 211 is to be further purified, upon opening valve 218 and closing valves 217, 220, 222 and 224 it is passed via conduit 219 through tower 226 which may be packed with sodium fluoride pellets and operated at 60–90° F. for the purpose of removing the remaining hydrogen fluoride. The effluent withdrawn via conduit 227 including open valve 229 is substantially free of hydrogen fluoride, and it is passed through tower 228 which may be packed with a synthetic zeolite absorbent such as described for tower 89 in FIGURE 2. Tower 228 may be operated at a temperature of 60–90° F., and normal ambient temperature operation is usually satisfactory for towers 226 and 228. The synthetic zeolite in tower 228 removes impurities such as nitrous oxide and decomposes unstable compounds such as the fluoroamines, including $HNF_2$, or other unstable substances such as ozone.

The towers 226 and 228 may be regenerated when their absorbents are spent by closing valves 218, 229 and 246 and supplying heated airstreams via conduits 230 and 231 countercurrent to normal gas flow upon opening valves 232 and 233, respectively, and withdrawing the airstreams together with the desorbed impurity content from the tops of the towers 226 and 228 via conduits 234 and 235 upon opening valves 236 and 237, respectively. The airstreams used in regeneration may have a temperature of about 400° F., and the towers 226 and 228 may be cooled to ambient temperature and purged before being placed back on stream by means of ambient temperature nitrogen streams which are supplied via conduits 238 and 239 upon opening valves 240 and 241, respectively. The purge gas is withdrawn via conduits 234 and 235 upon opening valves 236 and 237, respectively. Upon cooling of the towers, the valves 236 and 237 are closed, valves 218, 229 and 246 are opened, and the towers 226 and 228 placed back on stream. As is well known, pairs of sodium fluoride and zeolite towers may be used and regenerated alternately in a manner known to the art to allow continuous operation. A single tower in each instance has been shown and described in the interest of clarity.

The gas stream withdrawn via conduit 245 is expanded in valve 246, passed through coil portion 247 and then into vessel 248. The vessel 248 is immersed in liquid nitrogen 250 contained in vessel 251 which may be supplied thereto via conduit 252 upon opening valve 253.

Valve 255 in conduit 256 is normally closed, and liquid product is condensed and passed into vessel 248 where it collects under a vacuum of 24–26 inches of mercury maintained by suction on conduit 257 by means of vacuum pump 258 upon opening valve 259. The nitrogen or other uncondensed gas content of the gaseous mixture escapes through conduit 257 to pump 258 and it is exhausted to the atmosphere via conduit 260.

The liquid collecting in vessel 248 contains nitrogen trifluoride and trace amounts of nitrous oxide and dinitrogen difluoride, and it may be withdrawn and passed via conduits 256, 262 and 267 into container 269 upon opening valves 255, 261 and 268, closing valves 220, 246, 259, 263 and 282, and pressurizing vessel 248 with helium supplied via conduit 265 upon opening valve 266. The container 269 is immersed in liquid nitrogen 271 in vessel 272 which is supplied thereto via conduit 273 upon opening valve 274. The liquid nitrogen may be withdrawn via conduit 275 upon opening valve 276, water supplied to container 272 via conduit 277 upon opening valve 278, and the liquid contents of container 269 vaporized and supplied to cylinder 280 upon closing valves 220 and 261 and opening valves 263 and 268, or to cylinder 281 upon closing valves 220, 255, and 263 and opening valves 261, 268 and 282, or passed via conduits 267, 221, 214 and 216 directly to tetrafluorohydrazine reactor 215 upon closing valves 218, 224, 261 and 263 and opening valves 217, 220 and 268. The contents of cylinder 280 may be supplied to conduit 221 for passage to reactor 215 by opening valve 263 and closing valves 261 and 268, and the contents of cylinder 281 by opening valves 261 and 282 and closing valves 255, 263 and 268. When passed to reactor 215, preferably a diluent gas such as nitrogen is supplied to the nitrogen trifluoride flowing in conduit 221 by opening valve 222 in conduit 223 and diluting the nitrogen trifluoride to the desired level.

The diluted nitrogen trifluoride flowing in conduit 216 is passed upward through tetrafluorohydrazine reactor 215 upon opening valve 217. The reactor 215 contains a fluorine acceptor preferably in particulate form which may be petroleum coke supplied thereto via inlet 285 and withdrawn after use via outlet 286. The gaseous feed to the reactor 215 preferably is such as to keep the particles of coke fluidized and the furnace 287 surrounding the lower portion of the reactor supplies heat to maintain a desired reaction temperature.

The gaseous feed passes upward through the fluidized bed of coke where it is reacted to produce a gaseous mixture containing tetrafluorohydrazine, the particles of fluorine acceptor separated from the gaseous mixture, and then the product gases withdrawn via conduit 289 and passed through solids trap 290 to remove any entrained solids. The crude tetrafluorohydrazine is withdrawn from solids trap 290 via conduit 291, passed through filter 292 which may be packed with spun Orlon fibers having a diameter of 7 microns, and then withdrawn via conduit 293 and passed through back-up filter 294 which may be similar to filter 292. The filtered gases are withdrawn via conduit 295, passed through coil 296 surrounding vessel 297 and then into vessel 297. The vessel 297 is immersed in a Dry Ice-acetone bath 298 contained in vessel 299 and supplied thereto as indicated at 300. Hydrogen fluoride, fluorocarbons containing about 4–14 carbon atoms, and similar readily condensable materials collect as a liquid in vessel 297 and may be withdrawn periodically upon opening valve 303 in conduit 304.

Gaseous effluent containing tetrafluorohydrazine and impurities is withdrawn from vessel 297 via conduit 307 including open valve 308 and passed to sodium fluoride tower 309 where additional hydrogen fluoride is absorbed. The tower 309 may be operated at ambient temperature such as 60–90° F. and regenerated as described above for tower 226, by supplying a heated airstream at 400° F. via conduit 310 upon opening valve 311 and closing valves 308, 321 and 347. The heated airstream passes upward through tower 309 and it is withdrawn from the top via conduit 312 upon opening valve 313. After regeneration is effected, valve 311 is closed, valve 315 in conduit 316 is opened, and a cool nitrogen stream may be supplied to purge tower 309 and cool it to ambient temperature. The spent nitrogen is withdrawn via conduit 312 and open valve 313 in a manner similar to the airstream. Upon completing the regeneration, valves 313 and 311 and 315 are closed, valve 308 is opened, and the purification of tetrafluorohydrazine reaction products is continued. If desired, as is well known in the art, two towers 309 may be provided with one tower being regenerated while the second is on stream to thereby allow continuous operation.

The gaseous effluent withdrawn from tower 309 via conduit 317 is passed through filter 318 where solid entrained matter is removed and via conduit 319 through flowmeter 320 where the rate of gas flow is measured. If desired, upon opening valve 347 samples of the tetrafluorohydrazine reactor gas flowing in conduit 319 may be withdrawn via conduit 346 for analysis, or venting to the atmosphere. The gaseous effluent may be expanded in valve 321 to about 24–26 inches of mercury vacuum and passed via conduit 322 and coil 323 into vessel 324. The vessel 324 is immersed in liquid oxygen 325 contained in vessel 326 which may be supplied thereto via conduit 327 upon opening valve 328. A crude liquid tetrafluorohydrazine product is condensed and collected in the liquid state in vessel 324 which contains tetrafluorohydrazine, nitrogen trifluoride, hexafluoroethane, sulfur hexafluoride, nitrous oxide, and perhaps other impurities. Non-condensable impurities are withdrawn from the top of vessel 324 via conduit 333 including open valve 334 and passed through coil portion 335 into vessel 336. Vessel 336 is immersed in liquid oxygen 337 contained in vessel 338 and supplied thereto upon opening valve 339 in conduit 340. Upon opening valve 348, the vessel 336 may be in communication via conduit 341 with the entrance side of vacuum pump 342 and a vacuum such as about 24–26 inches of mercury may be maintained in vessel 336 and also in vessel 324 via conduit 333 upon opening valve 334. Non-condensed gases such as nitrogen, helium, etc. are vented to the atmosphere via conduit 343 leading from the exhaust side of vacuum pump 342. The liquid condensing in vessel 336 contains largely nitrogen trifluoride and it may be withdrawn periodically via conduit 344 upon opening valve 345.

The liquid collected in vessel 324 may be withdrawn upon closing valves 321 and 334, opening normally closed valve 349 in conduit 350, pressurizing vessel 324 by means of helium supplied via conduit 351 upon opening valve 352, and then passed to distillation column 353. Prior to transferring crude product, distillation column 353 may be cooled by supplying liquid nitrogen at a rate controlled by valve 354 via conduit 355 to coil 356 where it is expanded and the resultant gaseous nitrogen vented to the atmosphere via conduit 357.

The distillation column 353 contains a pool of crude product 358 in heat exchange relationship with a constant heat input electric heater 359 provided with electrical leads 360 and 361 which are connected to a suitable source of electrical current. Stainless steel curls, Raschig rings or other suitable packing 362 are provided in the intermediate portion of column 353 and retained in position by means of screen 363. The column 353 also is provided with a thermometer 364 positioned a short distance below coil 365.

Liquid nitrogen is supplied to coil 365 via conduit 368 upon opening of valve 369. The valve 369 is operated by pressure controller 370 in response to the pressure existing in conduit 371. Since conduit 371 is in communication with the top of distillation column 353, the pressures existing in each are the same. Liquid nitrogen is supplied to coil 365 in an amount sufficient to assure a desired constant pressure being maintained within the distillation column 353 by condensation of vapors rising in the column, and to provide reflux for the column. A suitable pressure may be 2 lbs. p.s.i.g. Upon vaporization of the liquid nitrogen in coil 365, the nitrogen vapor may be vented to the atmosphere via conduit 373.

An analyzer 374 which may be of the infrared spectrophotometer type is in communication with conduit 371, and samples of the gaseous stream flowing in conduit 371 may be withdrawn frequently and analyzed. A flowmeter 376 also is provided to measure the flow rate of the gaseous stream in conduit 371.

The distillation column 353 is operated batchwise to produce substantially pure tetrafluorohydrazine from the crude product in vessel 324 containing impurities such as nitrogen trifluoride, carbon tetrafluoride, hexafluoroethane, sulfur hexafluoride and nitrous oxide. Small amounts of nitrogen, helium and other low boiling impurities also may be present. The pressure in the column 353 may be maintained at a constant level throughout the distillation such as 2 p.s.i.g. by controlling the liquid nitrogen feed rate to coil 365. The initial fraction is withdrawn via conduit 371 and upon closing valve 377 in conduit 378 and valve 379 in conduit 380 the nitrogen, helium, and other low boiling impurities may be withdrawn via conduit 382 upon opening valve 383 and vented to the atmosphere. Thereafter, valve 383 may be closed, valve 379 opened and the next fraction from column 353 passed via conduits 371 and 380 and coil 384 into recycle receiver 385. The recycle receiver 385 is immersed in liquid nitrogen 386 contained in vessel 387, and supplied thereto via conduit 388 upon opening valve 389. This fraction may have a boiling point up to −200° F., after removal of nitrogen and helium, and normally contains carbon tetrafluoride and nitrogen trifluoride impurities which are condensed within coil 384 and collected in vessel 385. As the temperature in the top of column 353 continues to rise to −128° F. as indicated by temperature indicator 364, nitrous oxide is boiled off and at this time valve 379 is closed, valve 383 opened, and the nitrous oxide is vented to the atmosphere via conduit 382. Thereafter, as the temperature in the column rises from −109° F. to −100° F., the hexafluoroethane concentration increases and while this fraction is less than 50% tetrafluorohydrazine as indicated by analyzer 374, it is likewise vented to the atmosphere through conduit 382 upon opening valve 383 and closing valve 379. Thereafter, valve 383 is closed, valve 379 is opened, and the next fraction boiling at a higher temperature is passed to the recycle receiver 385. This latter fraction contains tetrafluorohydrazine in increasing percentages and hexafluoroethane as an impurity in decreasing percentages as the temperature rises in the top of the column. This increase in tetrafluorohydrazine concentration rises from about 50% to 96.5%, and then valve 379 is closed, valve 377 is opened, and the substantially pure tetrafluorohydrazine fraction allowed to pass via conduit 378 into pure product receiver 392. Product receiver 392 is immersed in liquid nitrogen 393 contained in vessel 394 and supplied thereto via conduit 395 upon opening valve 396. The production of purified tetrafluorohydrazine is continued until the temperature increases in the top of the column 353 to a level indicating an increase in the sulfur hexafluoride content. When the sulfur hexafluoride content reaches approximately 1%, as indicated by the increase in column temperature and by analyzer 374, the valve 377 is closed, valve 379 opened, and the impure gas allowed to pass to recycle receiver 385 until the tetrafluorohydrazine content is less than about 50%. Then valve 379 is closed, valve 383 opened, and the impure gas is vented to the atmosphere via conduit 382.

The purified tetrafluorohydrazine collected in vessel 392 is transferred to cylinder 400 by closing valve 377, opening normally closed valve 401 in conduit 402, and then pressurizing vessel 392 by means of helium delivered via conduit 403 upon opening valve 404. The impure product for recycle collected in vessel 385 may be transferred to cylinder 405 via conduit 406 by closing valves 224 and 379, opening valves 407 and 408, and pressurizing vessel 385 with helium supplied via conduit 410 upon opening valve 411. The impure product may be recycled to the tetrafluorohydrazine reactor by closing valve 407, opening valves 224 and 408, and then passing the contents via conduits 225 and 216 to reactor 215.

Referring now to FIGURE 4, which is a sectional view of a divided electrolytic cell that is especially useful for the production of nitrogen trifluoride in the apparatus of FIGURE 3, and to FIGURE 5, which is a sectional view taken along line a—a of FIGURE 4, opposed pairs of U-shaped cathodes 415 and U-shaped anodes 416 are mounted in cell 417 in spaced relationship and separated by means of diaphragm 418 into an anode compartment 419 and a cathode compartment 420. The cathodes 415 and anodes 416 are electrically connected to a suitable direct current source by means of leads 421 and 422, respectively. Diluent gas such as nitrogen may be supplied to the anode compartment 419 via conduit 423 at a rate controlled by valve 424 to provide a desired composition in the off-gases as discussed for FIGURES 2 and 3. Gases are withdrawn from the anode compartment via conduit 425, and gases evolved at the cathode are withdrawn from cathode compartment 420 via conduit 426. The cathode compartment 420 is provided with a plurality of vertically arranged temperature control coils 430 arranged within a short distance of the surface of cathodes 415, but spaced therefrom a sufficient distance to provide room for easy vertical circulation of the electrolyte. Similarly, anode compartment 419 is provided with a plurality of vertically arranged temperature control coils 431 which are spaced from anodes 416 so as to allow for easy vertical circulation of the electrolyte in a manner similar to that described for the cathode compartment, and yet close enough to the anode surface for effective temperature control. Fresh temperature control fluid at a temperature to maintain the desired temperature within the cell 417 is supplied to coil 430 at end 432 at a rate controlled by valve 433 and withdrawn therefrom at end 434 for passage back to a temperature conditioning system which may be similar to that discussed in connection with FIGURE 2 of the drawings. Similarly, coil 431 is provided with fresh temperature control fluid at end 435 at a rate controlled by valve 436, and withdrawn at end 437 for temperature conditioning before recycling.

The described arrangement of the paired anodes, paired cathodes, and their respective temperature control coils assures a maximum amount of vertical circulation of the electrolyte within the cell, and without appreciable transverse circulation of a degree resulting in mixing of the anode and cathode cell gases. This is very undesirable in view of the explosion hazard normally presented when the anode gas contains an appreciable hydrogen content without dilution with a diluent gas to a non-explosive level. While the spacing may vary considerably, it is preferred that the anode and cathode be spaced approximately 3–4 inches, and that the coils be approximately 1½–3 inches from the anode and cathode. Also, for best results the coils should be spaced vertically along substantially the entire anode and cathode surfaces. This arrangement allows sufficient room for vertical circulation and good temperature control without appreciable intermixing of the anode and cathode gases. The temperature control fluid supplied to the coils may be heated or cooled depending upon the requirements of the cell to arrive at the desired operating temperature. Normally, the fluid will be cooled when preparing nitrogen trifluoride over extended periods of time since the anodes and cathodes become hot and the heat must be removed for efficient operation. In such event, the electrolyte is heated by the anode and cathode surfaces, the lighter hot electrolyte rises vertically along the anode and cathode surfaces toward the top of the cell, and then downward along the cool coils as its density becomes greater. Thus, an effective vertical circulation is set up with little or no mixing of the anode and cathode gases.

Referring now to FIGURE 6, which illustrates a preferred tetrafluorohydrazine reactor for use in the apparatus of FIGURE 3, the reactor 440 may be provided with a lower elongated cylindrical portion 441 of relatively small diameter, and an upper enlarged cylindrical portion 442 which is relatively short. The lower end of portion 441 may be inclined at approximately a 45° angle at 443 and a neck portion 444 provided which is threaded and closed by means of cap 445. The neck portion 444 forms an outlet for a fluorine acceptor such as petroleum coke in particulate form, and conduit 446 provided with cap 447 forms an inlet therefor. A gaseous reaction mixture containing nitrogen trifluoride may be supplied via conduit 450 at a velocity sufficient to assure fluidization within the area 451 and the inner portion 452 of conduit 450 may be turned downward and positioned so that the incoming gases strike inclined surfaces 443 to thereby assure a more effective fluidizing effect. An electrical furnace 455 provided with electrical leads 458 to a source of electrical current surrounds the outer wall of reactor 441 in the vicinity of area 451 for the purpose of supplying heat to the reactor and assuring that the desired reaction temperature is maintained. Insulation 454 is provided above electrical heater 455 to retain the heat supplied to the reaction mixture. Conditions promoting a fluidized bed reaction may be maintained within the cylindrical portion 441, and the reaction gases supplied via conduit 450 may be passed upward therethrough and reacted with the fluidized particles of coke. Upon exit from portion 441 into portion 442, the velocity of the gases undergoes a marked drop and fluidization is no longer possible in area 457, thereby causing the coke particles to separate from the reacted gases and fall downward into the area 451 for further fluidization. The gaseous reaction mixture is withdrawn via conduit 456 for purification as discussed in connection with FIGURE 3.

FIGURES 7, 8 and 9 illustrate one preferred form of an electrode which is especially useful in an electrolytic cell for producing nitrogen trifluoride as the cathode and/or the anode. Referring now to FIGURES 7, 8 and 9, spaced plates 460 and 461 are joined at their upper and lower ends to members 462 and 463 respectively by welds or other means of providing a liquid-tight seal. Similarly, side members 464 and 465 are joined to the left and right edges, respectively, of plates 460 and 461 in a liquid-tight manner by welds or other suitable means. The arrangement of spaced plates 460 and 461, members 464 and 465, and members 462 and 463 is such that an internal space 466 is formed in which a temperature control coil 467 is provided. The temperature control coil 467 may have an inlet portion 468 which supplies temperature control fluid to coil 467 at a rate controlled by valve 469 and an outlet portion 470 which extend through liquid-tight openings 473 in member 462. The voids in space 466 between portions of the coil 467 are filled with a heat conducting substance such as solder, Babbitt metal, etc. as indicated at 471, to thereby assure efficient heat transfer between the temperature control fluid flowing in coil 467 and the members 460–465. This arrangement allows a desired electrode surface temperature to be maintained with the advantages of increased efficiency in the electrolytic process, reduced corrosion and a lower load on other temperature control means which may be provided for the electrolytic cell. An electrical lead 472 may be provided which may be connected with a source of electrical current when the electrode is in use.

Referring now to FIGURES 10, 11 and 12, which illustrate another form of electrode which is especially useful in an electrolytic cell for producing nitrogen trifluoride as the anode and/or the cathode, the relatively thick central member 475 is bored with a plurality of holes 476 forming vertical conduits therein. Top and bottom members 477 and 478 are provided with grooves 479 and 480, respectively, in their internal faces which are in communication with the conduits 476 and form inlet and outlet headers therefor. The members 477 and 478 may be joined to top and bottom of member 475 by welds or other convenient means to assure that a liquid-tight joint is made. The top member 477 has a vertical bore 481 to which is connected conduit 482 for passing temperature control fluid to inlet header 479 at a rate controlled by valve 486. Inlet header 479 does not extend the full length of member 475 so as to allow space for bore 483 which is in communication with outlet header 480 and outlet conduit 484. The top member 477 may be provided with electrical lead 485 which may be connected to a source of electrical current when the electrode is in use.

The members forming external surfaces of the electrodes discussed in FIGURES 7–12 above preferably are formed of nickel when used in an electrolytic cell for producing nitrogen trifluoride. However, in some instances other satisfactory materials may be used such as ferrous metal and graphite. While the electrodes are especially useful in electrolytic cells for producing nitrogen trifluoride, obviously their use is not limited thereto and they may be used for carrying out electrolytic processes in general where a temperature control problem is present. In using the electrodes, a temperature control fluid which may be hot or cold is supplied in a controlled amount as necessary to maintain the desired electrode surface temperature. The electrode may be used in the normal manner in all other respects.

FIGURE 13 graphically illustrates a partial phase diagram of the $NH_3$-HF system. By reference to FIGURE 13, it is possible to determine the approximate lower temperature limit for operating an electrolytic cell for producing nitrogen trifluoride with a given ratio of HF to $NH_3$ in the molten electrolyte. The preferred ratio of HF to $NH_3$ is 2.05:1 to 2.8:1 and it is apparent that the lower temperature limit for the molten electrolyte over this range is between about 256° F. and 112° F. as the composition has a lower melting point with increasing amounts of HF. Preferably, a given electrolyte is maintained in the molten condition and at a temperature not more than about 50–60° F. above the melting point. For a preferred ratio of HF to $NH_3$ such as 2.2:1 to 2.5:1, usually the electrolyte temperature should be between about 225° F. and 275° F., with best results usually being obtained between 240–260° F. Ratios of HF to $NH_3$ above about 2.8 usually are not preferred since elemental fluorine may be evolved in some instances.

FIGURE 14 graphically illustrates the manner in which the percent conversion (by volume) to $N_2F_4$ of the $NF_3$ content in the feed gas to the tetrafluorohydrazine reactor varies with the initial percent nitrogen trifluoride content when carbon tetrafluoride concentrations varying between 0.5% and 5% are formed as a by-product during the reaction. As may be determined from an inspection of the various curves, usually the percent conversion is lower with increasing percentages of nitrogen trifluoride in the feed and higher when increasing percentages of carbon tetrafluoride are produced as a by-product during the reaction. For instance, when the reactor is operated under conditions producing 0.5% carbon tetrafluoride in the off gases, this amount of carbon tetrafluoride being formed as a by-product during the reaction, the percent conversion varies between about 28% conversion at 35% nitrogen trifluoride in the feed gas and about 2% conversion at 100% nitrogen trifluoride in the feed gas. When the reactor is operated under conditions producing during the reaction 5% carbon tetrafluoride in the off gases, the percent conversion rises to about 50% conversion at 35% nitrogen trifluoride in the feed gas, and about 33% conversion at 100% nitrogen trifluoride in the feed gas. However, as may be noted from FIGURE 15, the percent overall yield of tetrafluorohydrazine is detrimentally affected to a marked extent when the off gases from the reactor contain increasing amounts of carbon tetrafluoride that is produced as a by-product during the reaction. Therefore, when maximum yields of tetrafluorohydrazine are desired it is essential that for a given feed the reactor be operated under conditions to produce a minimum amount of carbon tetrafluoride by-product in the off gases even though the percent conversion may be lower and a greater amount of recycling of the resultant unreacted nitrogen trifluoride may be necessary. Upon reference to FIGURE 15, for a given feed mixture it may be noted that markedly higher yields of tetrafluorohydrazine are obtained when only 1% (by volume) carbon tetrafluoride is produced as a by-product during the reaction and a very substantial improvement is noted when up to about 3% (by volume) is produced.

The data for FIGURES 14 and 15 were obtained when operating the tetrafluorohydrazine reactor with carbon in the form of petroleum coke as the fluorine acceptor under temperature conditions to produce during the reaction the percentages (by volume) of carbon tetrafluoride shown by the various curves at varying percentages (by volume) of nitrogen trifluoride in the feed gas. The remainder of the feed gas was a diluent such as nitrogen and/or carbon tetrafluoride. In arriving at the most economic feed gas mixture for operating the tetrafluorohydrazine reactor, it may be desirable in most instances to compromise between the maximum conversion as shown by FIGURE 14 and maximum yield as shown by FIGURE 15 and select conditions which will result in a satisfactory yield and conversion rate with a practical amount of recycling of the unreacted nitrogen trifluoride. Thus, while the reactor may be operated and adequate temperature control obtained with a feed composed of 20–90% (by volume) nitrogen trifluoride and the remainder one or more gaseous diluents such as nitrogen, argon, helium, carbon tetrafluoride, etc., it is usually desirable to operate with about 40–60% (by volume) of nitrogen trifluoride. Best results may be obtained in many instances with 45–55% (by volume) nitrogen fluoride in the feed and the remainder diluent gas. Regardless of the composition of the feed gas, as discussed more fully hereinafter it is necessary that the temperature at which the reaction is effected be carefully controlled and the diluent present in the feed renders this possible. The reaction temperature cannot be controlled adequately in the absence of the diluent gas and also the explosion hazard is increased greatly.

It has been discovered that careful control of the reaction temperature in the tetrafluorohydrazine reactor when using carbon such as petroleum coke as the fluorine acceptor will result in much less carbon tetrafluoride and hexafluoroethane being produced and present in the off gases, and that this provides important advantages. While the reason for the lower carbon tetrafluoride and hexafluoroethane contents at lower reaction temperatures is not fully understood, it is believed that a solid carbon monofluoride is formed which is stable at the lower operating temperature and this prevents the formation of large amounts of carbon tetrafluoride or hexafluoroethane from the coke and the fluorine produced when nitrogen trifluoride reacts to produce tetrafluorohydrazine. By operating the reactor at reaction temperatures of about 740–860° F., the carbon tetrafluoride and hexafluoroethane contents of the off gases may be 25% or lower than those normally encountered when operating at higher reactor temperatures such as 900° F. The manner in which the carbon tetrafluoride content formed during the reaction varies with the reactor or reaction temperature is graphically illustrated in FIGURE 16. It has been found that the amount of hexafluoroethane produced varies directly with the amount of carbon tetrafluoride and thus this graph also indicates the relative amount of hexafluoroethane that is produced, as well as higher fluorocarbons. Upon reference to FIGURE 16, it may be noted that when using carbon in the form of petroleum coke as the fluorine acceptor increasing reaction temperatures between about 740–860° F. will result in increasing percentages of carbon tetrafluoride being formed during the reaction for a given nitrogen trifluoride content in the inlet gases. Further, when operating at a reaction temperature below about 800° F., the carbon tetrafluoride content is 3% or less, and when operating at a reaction temperature below about 770° F., less than 1% carbon tetrafluoride is produced. A reaction temperature of about 750–800° F. is usually preferred and for best results a temperature of 750–770° F.

The charge of carbon particles in the reactor gradually absorbs the released fluorine and when a maximum amount is absorbed it is necessary that the spent carbon be withdrawn and replaced with fresh carbon. The carbon may be in particulate form and have a particle size which may be readily fluidized such as 100–200 mesh. It should have a low sulfur content and preferably not over ½–1½%. Petroleum coke is especially useful but anode graphite and other suitable forms of carbon may be used.

The boiling points of tetrafluorohydrazine and hexafluoroethane are −100° F. and −109° F., respectively. Thus, these two substances are very difficult to separate by low temperature distillation and a low hexafluoroethane content is very desirable since less tetrafluorohydrazine need be vented to the atmosphere in the purification scheme discussed in FIGURE 3, thereby resulting in higher yields. It has been further discovered that the hexafluoroethane and higher fluorocarbon content of the reactor off gases varies with the amount of carbon tetrafluoride formed during the reaction. For instance, when the reactor is operated under conditions to produce a high carbon tetrafluoride content in the off gas, then a high hexafluoroethane content also is produced with a corresponding lower yield upon purification of the crude tetrafluorohydrazine. The manner in which the above varies is graphically illustrated in FIGURE 17. Upon reference to FIGURE 17, it may be noted that the hexafluoroethane to tetrafluorohydrazine ratio increases quite markedly with an increase in the amount of carbon tetrafluoride formed during the reaction. The desirability of keeping the percent carbon tetrafluoride formed during the reaction down to not more than about 3% and preferably 1% or below is apparent in view of the discussion in connection with the purification scheme of FIGURE 3. When a minimum of hexafluoroethane is produced, distillation is simplified and yields improve greatly.

It has been further discovered that the tetrafluorohydrazine reactor may be operated more conveniently when the reaction temperature is adjusted to provide an amount of carbon tetrafluoride in the off gases which previously has been found to give the best results. This is especially true of start-up operations and in other instances when equilibrium conditions are not present in the reactor. Thus, the present invention also provides a more efficient process for preparing tetrafluorohydrazine wherein the reaction is controlled by increasing or decreasing the reaction temperature to produce a predetermined amount of by-product carbon tetrafluoride which appears in the off gases and may be readily determined by analysis. For instance, the reactor may be operated to produce about 0.1–3% by volume of carbon tetrafluoride in the off gases by adjustment of the reaction temperature and thereby assure that good yields of tetrafluorohydrazine are obtained. Even better results may be obtained when the reactor is operated to provide about 0.1–1% of by-product carbon tetrafluoride in the reactor off gases.

The apparatus described in the discussion of FIGURE 3 may be operated as follows for the preparation of tetrafluorohydrazine. The divided electrolytic cell 145 preferably is of the type illustrated in FIGURES 4 and 5 and the electrolyte may be melted ammonium bifluoride to which gaseous hydrogen fluoride has been added to provide a mol ratio of HF to $NH_3$ of about 2.05:1 to 2.8:1 and preferably 2.2:1 to 2.5:1. This concentration of HF to $NH_3$ is maintained during operation of the electrolytic cell and the manner in which the mol ratio is arrived at is not of importance since HF and $NH_3$ in the desired ratio may be added directly. While not shown in the interest of simplifying the drawings, the molten electrolyte HF and $NH_3$ may be added to cell 145 of FIGURE 3 or cell 417 of FIGURE 4 in the manner described in the discussion of the cell of FIGURE 2. The cell may be operated at up to 5,000 amperes and preferably at about 3000–4000 amperes. The electrolyte is maintained in the molten state during operation of the cell and preferably within about 50° F. above the melting point of the specific electrolyte composition that is used. When the ratio of HF to $NH_3$ is about 2.2:1 to 2.5:1, the electrolyte temperature may be about 225–260° F., and satisfactory temperatures for other electrolyte compositions may be determined upon reference to FIGURE 13. The electrolyte 149 may be maintained at the desired operating temperature by means of a temperature control fluid supplied to the conduit 152. Also, the electrodes of FIGURES 7–12 may be used in cell 145 to aid in controlling the electrolyte temperature.

When the cell is of the design illustrated in FIGURES 4 and 5, the corrosion rate of the anode is reduced to about one-fifth of that existing in a cell with poor heat transfer characteristics. It has been further discovered that the electrode life may be increased even longer by constructing the anode and cathode of the same material and preferably making them of similar design, and reversing the polarity a number of times over their expected life. For example, the polarity may be reversed 3–6 times over the expected electrode life with each electrode serving as the anode approximately the same period of time.

The cathode gas discharged via conduit 160 may be substantially all hydrogen, with traces of nitrogen trifluoride, nitrous oxide and nitrogen. The cathode gases may be evolved at 60 standard cubic feet per hour.

The product gas is withdrawn from the anode compartment via conduit 166 in a volume of about 20 standard cubic feet per hour on an undiluted basis, and may analyze 65–70% nitrogen trifluoride, 1–3% dinitrogen difluoride, 0–2% nitrous oxide, 0.1% hydrogen and 2–10% hydrogen fluoride and the balance nitrogen. Some water vapor also may be present. Sufficient diluent nitrogen in gaseous form may be added to the anode compartment via conduit 174 to maintain the nitrogen trifluoride concentration in the evolved gases below 50% and thereby reduce the explosion hazard, as well as provide diluent nitrogen for the reaction mixture supplied to reactor 215. At low amperage (500 amps) the hydrogen output in the anode gas is relatively high, and decreases from a ratio of 5:1 of nitrogen trifluoride to hydrogen during start-up to about 65:1 during prolonged operation. Therefore, addition of sufficient nitrogen to the anode compartment is required to prevent explosion. The electrolytic cell may be operated at about 4000–5000 amps during normal operation.

The diluted product gases may be passed into gas bag 170 having a volume of about 24–30 cubic feet, and blower 185 assures that the gases are moved through the system without causing undue pressures in the electrolytic cell 145. The coil 191 condenses moisture and hydrogen fluoride from the product stream so that the effluent liquid collecting in vessel 188 and withdrawn via conduit 196 analyzes of about 50% hydrogen fluoride. The gaseous product withdrawn from vessel 188 and passed to vessel 201 has additional moisture and hydrogen fluoride condensed therefrom which collects in vessel 201. The partially purified product gases withdrawn via conduit 209 contains about ½–1% hydrogen fluoride and the remaining initial impurities mentioned above. The liquid collecting in vessel 201 and withdrawn via conduit 204 may analyze about 80% hydrogen fluoride and the remainder water. Preferably, the product gases flowing in conduit 209 are passed via conduits 214 and 216 to reactor 215. However if desired the gases may be further purified as mentioned in the FIGURE 3 discussion, and the purified nitrogen trifluoride fed to conduit 214 along with diluent gas for passage to reactor 215. The feed to the reactor may contain 20–90% by volume nitrogen trifluoride and the remainder impurities as noted above and diluent gases such as nitrogen. Better temperature control of the reaction may be possible when the feed contains 40–60% nitrogen trifluoride and the remainder gaseous diluent, with best results usually being obtained with 45–55% nitrogen trifluoride and the remainder gaseous diluent.

The reactor 215 may be provided with a fluidized coke bed containing petroleum coke of 100–200 mesh. The furnace 287 may maintain a reaction temperature of about 740–860° F. Better results are usually obtained at a reaction temperature of about 750–800° F., and best results at a reaction temperature of about 750–770° F. The reactor is preferably of the design illustrated in FIGURE 6, and when it is of such design, its lower section may be of 2½ inches I.D. pipe and have a height of about 4 feet and contain a fluidized coke bed 32 inches in depth. The enlarged upper section may be about 8 inches in I.D. and 1½ feet high, and the surfaces 443 may be inclined at about 45° with the centerline. The gaseous feed may be supplied via conduit 450 at the rate of about 600–750 standard cubic feet per hour. If desired, the reactor may be scaled up or down in size based on the above data and with the gaseous reactants being present in the fluidized bed for approximately the same period of time. The lower velocities encountered in the enlarged upper section stop fluidization so that a substantial quantity of coke does not pass from the top of the reactor. The stream of reactants may contain 20% tetrafluorohydrazine, 20–30% nitrogen trifluoride, 1–2% carbon tetrafluoride, ½–1½% hexafluoroethane, 0–.5% of other fluorocarbons, 0.4% sulfur hexafluoride, 2% hydrogen fluoride, traces of other impurities and the balance nitrogen. Based on one specific run, the material balance for the tetrafluorohydrazine reactor was as follows:

Total reactor feed

|  | Lbs. |
|---|---|
| $NF_3$ | 169.773 |
| $N_2$ | 71.825 |
| $N_2F_2$ | 1.511 |
| HF | 3.956 |
| C (in bed) | 49.285 |
| S (in bed) | .493 |
| | 296.843 |

Total reaction products

|  | Lbs. |
|---|---|
| $NF_3$ | 89.132 |
| $N_2F_4$ | 46.431 |
| $CF_4$ | 5.171 |
| $SF_6$ | 1.730 |
| C (in bed) | 49.715 |
| S (in bed) | .112 |
| F (in bed) | 21.849 |
| $N_2$ | 79.266 |
| HF (off gas) | .932 |
| HF (absorbed in NaF tower) | 3.024 |
| $C_2F_6$ | 2.279 |
| | 299.641 |

Reactor feed gas

|  | Mol, percent |
|---|---|
| $NF_3$ | 46.27 |
| $N_2$ | 49.42 |
| $N_2F_2$ | .49 |
| HF | 3.82 |
| | 100.00 |

Reactor off gases

|  | Mol, percent |
|---|---|
| $NF_3$ | 26.93 |
| $N_2F_4$ | 9.55 |
| $CF_4$ | 1.26 |
| $SF_6$ | .26 |
| $N_2$ | 60.65 |
| HF | 1.00 |
| $C_2F_6$ | .35 |
| | 100.00 |

A spun Orlon fiber filter may be used to remove fines in solids trap 290 which have been carried over from the fluidized coke bed. The higher fluorocarbons and most of the hydrogen fluoride is condensed in coil 296 and collected in vessel 297. Since the higher fluorocarbons and hydrogen fluoride would dissolve the sodium fluoride pellets contained in tower 309, condensing coil 296 and vessel 297 protect tower 309. The sodium fluoride contained in tower 309 removes the remaining hydrogen fluoride, and filter 318 removes any sodium fluoride fines which are carried out with the effluent gas.

The vessel 326 contains liquid oxygen and the crude product is condensed at liquid oxygen temperature. This is necessary since condensation of the product and impurities at liquid nitrogen temperature would result in plugging of the conduits. During the condensation, valve 334 is opened, valve 349 is closed, and vacuum pump 342 maintains a vacuum of about 25 inches of mercury in vessel 324. Nitrogen and other uncondensed gases are removed via the vacuum pump exhaust. When a desired quantity of product is condensed in vessel 324, the vessel 324 is pressurized with helium and the contents transferred batchwise to distillation column 353. Preliminary to this transfer, the distillation column 353 is precooled by means of liquid nitrogen. The reboiler section of distillation column 353 contains an electric heater 359 designed for constant heat input.

Liquid nitrogen flow to coil 365 is varied to condense rising vapors and thereby maintain the column pressure at about 2 p.s.i.g., and to condense reflux. Upon closing valves 349, 377 and 379 and opening valve 383, helium, nitrogen and other low boiling gases are first distilled off and passed to the atmosphere via conduit 382. Thereafter, valve 383 is closed, valve 379 opened, and a fraction passed to the receiver 385 at temperatures up to $-200°$ F. This fraction contains primarily nitrogen trifluoride and carbon tetrafluoride. As the temperature at the top of the column rises to $-128°$ F., nitrous oxide is evolved and valve 379 is closed, valve 383 is opened, and the nitrous oxide vented to the atmosphere via conduit 382. As the temperature rises from about $-109°$ F. to about $-100°$ F., the hexafluoroethane concentration increases and while this fraction is less than 50% $N_2F_4$, it is vented to the atmosphere via conduit 382 upon opening valve 383 and closing valve 379. Thereafter, valve 383 is closed, valve 379 is opened, and a crude tetrafluorohydrazine fraction is passed to vessel 385. When the purity reaches approximately 96.5% tetrafluorohydrazine, the valve 379 is closed, valve 377 is opened and substantially pure product is condensed in vessel 392. When the sulfur hexafluoride content increases to approximately 1%, valve 377 is closed, valve 379 is opened, and impure product passed to vessel 385 until the tetrafluorohydrazine content is less than 50%. Then valve 379 is closed, valve 383 opened, and the impure material vented to the atmosphere. The pure product in vessel 392 is transferred to product cylinder 400 and the impure product in vessel 385 is transferred to cylinder 405 for recycle back to reactor 215.

Based upon the total volume of liquid transferred to the reboiler section of distillation column 353, the fraction distribution was as follows in one specific run:

| Cut | Components | Percent by volume | Fraction $N_2F_4$, Percent | Delivered to— |
|---|---|---|---|---|
| $N_2$ | $N_2$ and He | 0.8 | 0 | Vent. |
| $NF_3$ | $NF_3$ | 50.4 | 0 | Recycle receiver. |
|  | $CF_4$ | 11.6 | | |
| $N_2O$ | $N_2O$ | 0.2 | 0 | Vent. |
| $C_2F_6$ | $C_2F_6$ | 1.3 | 50 | Vent. |
|  | $N_2F_4$ | 1.3 | | |
| Crude | $C_2F_6$ | 0.7 | 93 | Crude receiver. |
|  | $N_2F_4$ | 9.8 | | |
| $N_2F_4$ | $C_2F_6$ | 0.6 | 96.5 | Product receiver. |
|  | $N_2F_4$ | 20.0 | | |
|  | $SF_6$ | 0.1 | | |
| Crude | $N_2F_4$ | 2.2 | 91.5 | Crude receiver |
|  | $SF_6$ | 0.2 | | |
| $SF_6$ | $N_2F_4$ | 0.4 | 50 | Vent. |
|  | $SF_6$ | 0.4 | | |
| | | 100.0 | | |

Under the prefered operating conditions for the reactor, the carbon in the fluidized bed forms a solid carbon fluoride in which the fluorine content reaches concentrations of about 30-40% by weight. When this concentration is reached, the activity of the bed falls off and it should be replaced with a fresh one. Only a small fraction such as below 25% of the free fluorine resulting from the reaction of nitrogen, trifluoride to produce tetrafluorohydrazine leaves the reactor in the off gas as carbon tetrafluoride, hexafluoroethane, or other fluorocarbons. This results in increased yields since less tetrafluorohydrazine is lost upon purification and the nitrogen trifluoride that is unconverted may be recycled a greater number of times.

Use of the batch distillation column 353 allows the crude tetrafluorohydrazine product to be separated from the recited impurities by fractional distillation alone. By carrying out the separation by low temperature distillation and by not introducing any foreign materials such as water or fluorocarbons into the system, it is possible to produce tetrafluorohydrazine with safety and in unusually high purity.

Dilution of nitrogen trifluoride feed to the tetrafluorohydrazine reactor results in better temperature control and elimination of hot spots, reduced corrosion, elimination of significant explosions, reduced solids blow over, increased conversions and reduced down time. Also, it is possible to feed the partially purified diluted anode gases containing approximately 45-55% nitrogen trifluoride directly to the tetrafluorohydrazine reactor. This eliminates extra labor, cylinder filling and handling, nitrous oxide and trace impurity removal, removal of last traces of hydrogen fluoride and extra condensing equipment.

The foregoing detailed discussion is for purposes of illustration only, and it is not intended as being limiting to the spirit or scope of the appended claims.

What is claimed is:

1. The method of reducing the hazard presented by an explosively reactive mixture, containing nitrogen trifluoride and a fuel, comprising diluting said reactive mixture with a pre-determined amount of diluent fluid and thereby placing the concentration of the nitrogen trifluoride and said diluted mixture outside the range of from about 9.4 mol percent to about 95 mol percent.

2. The method of claim 1 wherein said diluent fluid and said fuel are one and the same.

3. The method of reducing the hazard presented by an explosively reactive gaseous mixture, containing gaseous nitrogen trifluoride and a fuel, comprising diluting said mixture with at least one gas selected from the group consisting of nitrogen, hydrogen, helium and argon, so that the concentration of nitrogen trifluoride in said diluted mixture is outside the range of from about 9.4 mol percent to about 95 mol percent.

4. The method of claim 3 wherein said gas is helium.

5. The method of claim 3 wherein said gas is hydrogen.

6. The method of claim 3 wherein, further, the fuel is hydrogen, the diluent is nitrogen, and the concentration of nitrogen trifluoride in the diluted mixture is located within the area defined by the solid lines AB, BC, CD, DE, EF and FA in FIGURE 1.

7. A process for preparing tetrafluorohydrazine from nitrogen trifluoride in a manner which reduces explosion hazards comprising the steps of (a) diluting a nitrogen trifluoride-rich off-gas from an electrolytic cell with at least one gas selected from the group consisting of hydrogen and nitrogen, so that the relative concentrations of hydrogen, nitrogen, and nitrogen trifluoride in the diluted gaseous mixture fall within the area, shown in FIGURE 1, defined by the solid lines AB, BC, CD, DE, EF and FA and (b) reacting said gaseous mixture at a reaction temperature not exceeding 860° F. in the presence of carbon as a fluorine acceptor.

8. A process for preparing tetrafluorohydrazine from substantially pure nitrogen trifluoride in a manner which reduces explosion hazards comprising the steps of (a) diluting said nitrogen trifluoride with an inert gas to reduce its concentration in the resulting diluted mixture to less than 9.4 mol percent and (b) reacting said gaseous mixture at a reaction temperature not exceeding 860° F. in the presence of a fuel which acts as a fluorine acceptor.

9. The process of claim 8 wherein said inert gas is nitrogen.

10. The process of claim 8 wherein said inert gas is hydrogen.

References Cited

UNITED STATES PATENTS

| | | | |
|---|---|---|---|
| 3,122,416 | 2/1964 | Gould et al. | 260—653 |
| 3,220,799 | 11/1965 | Colburn | 23—205 |

FOREIGN PATENTS

| | | |
|---|---|---|
| 522,404 | 6/1940 | Great Britain. |

OSCAR R. VERTIZ, Primary Examiner.

JOHN H. MACK, Examiner.

H. S. WILLIAMS, H. S. MILLER, Assistant Examiners.